(12) United States Patent
Koo et al.

(10) Patent No.: US 11,968,398 B2
(45) Date of Patent: *Apr. 23, 2024

(54) METHOD AND DEVICE FOR PROCESSING VIDEO SIGNAL BY USING REDUCED SECONDARY TRANSFORM

(71) Applicant: LG Electronics Inc., Seoul (KR)

(72) Inventors: Moonmo Koo, Seoul (KR); Mehdi Salehifar, Seoul (KR); Seunghwan Kim, Seoul (KR); Jaehyun Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/109,495

(22) Filed: Feb. 14, 2023

(65) Prior Publication Data

US 2023/0199220 A1 Jun. 22, 2023

Related U.S. Application Data

(63) Continuation of application No. 17/034,949, filed on Sep. 28, 2020, now Pat. No. 11,616,985, which is a continuation of application No. PCT/KR2019/003812, filed on Apr. 1, 2019.

(Continued)

(51) Int. Cl.
*H04N 19/625* (2014.01)
*H04N 19/129* (2014.01)
(Continued)

(52) U.S. Cl.
CPC ......... *H04N 19/625* (2014.11); *H04N 19/129* (2014.11); *H04N 19/176* (2014.11); *H04N 19/18* (2014.11)

(58) Field of Classification Search
None
See application file for complete search history.

(56) References Cited

U.S. PATENT DOCUMENTS

| | | | | |
|---|---|---|---|---|
| 2014/0064361 A1* | 3/2014 | Karczewicz | ........... | H04N 19/30 375/240.03 |
| 2015/0124872 A1* | 5/2015 | Zhou | .................... | H04N 19/103 375/240.03 |

(Continued)

FOREIGN PATENT DOCUMENTS

| | | |
|---|---|---|
| CA | 3019490 | 11/2017 |
| CN | 103636205 | 3/2014 |

(Continued)

OTHER PUBLICATIONS

Saxena et al., "On Secondary Transforms for Prediction Residual," Samsung, IEEE, 2012.*

(Continued)

*Primary Examiner* — Michael J Hess
(74) *Attorney, Agent, or Firm* — Fish & Richardson P.C.

(57) ABSTRACT

The present disclosure provides a method of reconstructing a video signal based on a reduced secondary transform, which includes: obtaining a secondary transform index from the video signal; deriving a secondary transform corresponding to the secondary transform index, wherein the secondary transform represents a reduced secondary transform, and the reduced secondary transform represents a transform outputting L (L<N) transform coefficient data (L×1 transform coefficient vectors) based on inputted N residual data (N×1 residual vectors); obtaining a transform coefficient block by performing an entropy decoding and a dequantization for a current block (N×N); performing an inverse secondary transform for the transform coefficient block using the reduced secondary transform; performing an inverse primary transform for a block which the inverse secondary (Continued)

transform is applied to; and reconstructing the current block using a block which the inverse primary transform is applied to.

4 Claims, 23 Drawing Sheets

Related U.S. Application Data

(60) Provisional application No. 62/651,251, filed on Apr. 1, 2018.

(51) Int. Cl.
*H04N 19/176* (2014.01)
*H04N 19/18* (2014.01)

(56) References Cited

U.S. PATENT DOCUMENTS

| | | | |
|---|---|---|---|
| 2017/0034530 | A1 | 2/2017 | Cherepanov et al. |
| 2017/0094313 | A1 | 3/2017 | Zhao et al. |
| 2017/0324643 | A1 | 11/2017 | Seregin et al. |
| 2018/0098081 | A1* | 4/2018 | Zhao .................. H04N 19/61 |
| 2018/0103252 | A1* | 4/2018 | Hsieh .................. H04N 19/176 |
| 2018/0205949 | A1 | 7/2018 | Hsiang |
| 2019/0208203 | A1 | 7/2019 | Tsukuba |
| 2020/0020134 | A1 | 1/2020 | Tsukuba |
| 2020/0213626 | A1 | 7/2020 | Ikai |
| 2021/0297701 | A1* | 9/2021 | Tsukuba .................. H04N 19/30 |

FOREIGN PATENT DOCUMENTS

| | | |
|---|---|---|
| EP | 3567858 | 11/2019 |
| JP | 2013-542664 | 11/2013 |
| KR | 2017-0117112 | 10/2017 |
| KR | 2018-0014655 | 2/2018 |
| WO | WO 2017/191782 | 11/2017 |
| WO | WO 2017/195666 | 11/2017 |
| WO | WO 2017/195667 | 11/2017 |

OTHER PUBLICATIONS

Alshina, et al., "Known Tools Performance Investigation for Next Generation Video Coding," 52nd Meeting, Warsaw Poland, Jun. 2015.*

Chen et al., "Algorithm Description of Joint Exploration Test Model 1," Joint Video Exploration Team (JVET) of ITU-T SG 16 WP 3 and 1SO/IEC JTC 1/SC 29/WG 11, 1st meeting, Geneva, CH, dated Oct. 19-21, 2015, 27 pages, XP030150000.

Extended European Search Report in European Appln. No. 19780916.3, dated Apr. 13, 2021, 12 pages.

International Search Report in International Appln. No. PCT/KR2019/003812, dated Jul. 22, 2019, 7 pages (with English translation).

JVET, "Algorithm Description of Joint Exploration Test Model 4 (JEM4)," Joint Video Exploration Team (JVET) of ITU-T SG 16 WP 3 and ISO/IEC JTC1/SC29/WG11/N16511, 4th Meeting, Chengdu, CN, dated Oct. 2016, 39 pages, XP030023183.

Office Action in Chinese Appln. No. 201980034874.X, dated Jan. 13, 2022, 22 pages (with English translation).

Office Action in European Appln. No. 19780916.3, dated Jan. 31, 2022, 6 pages.

Office Action in Japanese Appln. No. 2021-502681, dated Oct. 5, 2021, 8 pages (with English translation).

Siekmann et al., "CE6—related: Simplification of the Reduced Secondary Transform," JVET-N0555, Presented at Joint Video Experts Team (JVET) of ITU-T SG 16 WP 3 and ISO/IEC JTC 1/SC 29/WG 11, 14th Meeting: Geneva, CH, Mar. 19-27, 2019, 5 pages.

Zhao et al., "JVET-B0059: TU-level non-separable secondary transform," Qualcomm Incorporated, 6 pages, XP030247106.

Chen et al., "Algorithm Description of Joint Exploration Test Model 1," Joint Video Exploration Team (JVET) of ITU-T SG 16 WP 3 and ISO/IEC JTC 1/SC 29/WG 11, Document: JVET-A1001, 1st meeting, Geneva, CH, Oct. 19-21, 2015, 27 pages.

Extended European Search Report in European Appln. No. 23191874.9, mailed on Nov. 3, 2023, 10 pages.

Notice of Allowance in Korean Appln. No.10-2022-7038688, mailed on Oct. 30, 2023, 14 pages (with English translation).

* cited by examiner

FIG. 6

| Configuration group | Index | Horizontal (row) transform | Vertical (column) transform | 35 intra Prediction modes | 67 intra Prediction modes |
|---|---|---|---|---|---|
| Group 0 (G0) | 0 | DST7 | DST7 | 0 | 0 |
| | 1 | DCT5 | DST7 | | |
| | 2 | DST7 | DCT5 | | |
| | 3 | DCT5 | DCT5 | | |
| Group 1 (G1) | 0 | DST7 | DST7 | 1, 3, 5, 7, 13, 15, 17, 19, 21, 23, 29, 31, 33 | 1, 3, 5, 7, 9, 11, 13, 23, 25, 27, 29, 31, 33, 35, 37, 39, 41, 43, 45, 55, 57, 59, 61, 63, 65 |
| | 1 | DST1 | DST7 | | |
| | 2 | DST7 | DST1 | | |
| | 3 | DST1 | DST1 | | |
| Group 2 (G2) | 0 | DST7 | DST7 | 2, 4, 6, 14, 16, 18, 20, 22, 30, 32, 34 | 2, 4, 6, 8, 10, 12, 24, 26, 28, 30, 32, 34, 36, 38, 40, 42, 44, 56, 58, 60, 64, 66 |
| | 1 | DCT8 | DST7 | | |
| | 2 | DST7 | DCT8 | | |
| | 3 | DCT8 | DCT8 | | |
| Group 3 (G3) | 0 | DST7 | DST7 | 8, 9, 10, 11, 12 (Neighboring angles to horizontal directions) | 14, 15, 16, 17, 18, 19, 20, 21, 22 (Neighboring angles to horizontal directions) |
| | 1 | DCT5 | DST7 | | |
| | 2 | DST7 | DCT8 | | |
| | 3 | DCT5 | DCT8 | | |
| Group 4 (G4) | 0 | DST7 | DST7 | 24, 25, 26, 27, 28 (Neighboring angles to vertical directions) | 46, 47, 48, 49, 50, 51, 52, 53, 54 (Neighboring angles to vertical directions) |
| | 1 | DCT8 | DST7 | | |
| | 2 | DST7 | DCT5 | | |
| | 3 | DCT8 | DCT5 | | |
| Group 5 (G5) | 0 | DCT8 | DCT8 | Inter prediction | Inter prediction |
| | 1 | DST7 | DCT8 | | |
| | 2 | DCT8 | DST7 | | |
| | 3 | DST7 | DST7 | | |

FIG. 12

| intra mode | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|
| set | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
| intra mode | 34 | 35 | 36 | 37 | 38 | 39 | 40 | 41 | 42 | 43 | 44 | 45 | 46 | 47 | 48 | 49 | 50 | 51 | 55 | 53 | 54 | 55 | 56 | 57 | 58 | 59 | 60 | 61 | 62 | 63 | 64 | 65 | 66 | 67 (LM) |
| set | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | NULL |

|   |   |   |    |
|---|---|---|----|
| 1 | 3 | 6 | 10 |
| 2 | 5 | 9 | 13 |
| 4 | 8 | 12| 15 |
| 7 | 11| 14| 16 |

FIG. 17A

|    |    |    |    |
|----|----|----|----|
| 1  | 2  | 3  | 4  |
| 5  | 6  | 7  | 8  |
| 9  | 10 | 11 | 12 |
| 13 | 14 | 15 | 16 |

FIG. 17B

|   |   |    |    |
|---|---|----|----|
| 1 | 5 | 9  | 13 |
| 2 | 6 | 10 | 14 |
| 3 | 7 | 11 | 15 |
| 4 | 8 | 12 | 16 |

METHOD AND DEVICE FOR PROCESSING VIDEO SIGNAL BY USING REDUCED SECONDARY TRANSFORM

CROSS-REFERENCE TO RELATED APPLICATIONS

This application is a continuation of U.S. application Ser. No. 17/034,949, filed on Sep. 28, 2020, which is a continuation pursuant to 35 U.S.C. § 119(e) of International Application No. PCT/KR2019/003812, with an international filing date of Apr. 1, 2019, which claims the benefit of U.S. Provisional Application No. 62/651,251 filed on Apr. 1, 2018, the contents of which are all hereby incorporated by reference herein in their entirety.

TECHNICAL FIELD

The present disclosure relates to a method and a device for processing a video signal, and more particularly, to a design of a Reduced Secondary Transform (RST) which may be applied to a 4×4 block, a layout and a scan order of transform coefficients generated after a 4×4 RST, and a transform index coding method for designating the 4×4 RST to be applied.

BACKGROUND ART

Next-generation video content will have characteristics of a high spatial resolution, a high frame rate, and high dimensionality of scene representation. In order to process such content, technologies, such as memory storage, a memory access rate, and processing power, will be remarkably increased.

Accordingly, it is necessary to design a new coding tool for more efficiently processing next-generation video content. Particularly, it is necessary to design a more efficient transform in terms of coding efficiency and complexity when a transform is applied.

SUMMARY

An embodiment of the present disclosure provides an encoder/decoder structure for reflecting a new transform design.

Furthermore, an embodiment of the present disclosure provides a design of a Reduced Secondary Transform (RST) which may be applied to a 4×4 block, a layout and a scan order of transform coefficients generated after a 4×4 RST, and a method and a structure of transform index coding for designating the 4×4 RST to be applied.

The present disclosure provides a method for reducing complexity and enhancing coding efficiency through a new transform design.

The present disclosure provides a method for designing an RST that may be applied to a 4×4 block.

The present disclosure provides a configuration of a region to which the 4×4 RST is to be applied, a method for arranging transform coefficients generated after applying the 4×4 RST, a scan order of the arranged transform coefficients, a method for sorting and combining transform coefficients generated for each block, and the like.

The present disclosure provides a method for coding a transform index that specifies the 4×4 RST.

The present disclosure provides a method for conditionally coding a corresponding transform index by checking whether a non-zero transform coefficient exists in an unacceptable region when applying the 4×4 RST.

The present disclosure provides a method for conditionally coding the corresponding transform index after coding a last non-zero transform coefficient position, and then omitting relevant residual coding for positions that are not accepted.

The present disclosure provides a method for applying different transform index coding and residual coding to a luma block and a chroma block when applying the 4×4 RST.

According to the present disclosure, when a still image or a moving picture is encoded, a computational amount can be significantly reduced compared with a case where another non-separable secondary transform (NSST) is applied by applying a 4×4 RST.

Furthermore, by considering that a valid transform coefficient does not exist in a specific region when applying the 4×4 RST, a performance can be enhanced by conditionally coding a transform index designating the 4×4 RST and applying optimization of related residual coding.

As described above, a computational complexity can be reduced and coding efficiency can be enhanced through a new low-complexity computation algorithm.

DESCRIPTION OF DRAWINGS

FIG. 3A is a diagram for describing a block split structure based on a quadtree (hereinafter referred to as a "QT")

FIG. 6 is a table showing a transform configuration group to which Multiple Transform Selection (MTS) is applied as an embodiment to which the present disclosure is applied.

FIG. 12 is a table showing allocation of a transform set for each intra prediction mode in an NSST as an embodiment to which the present disclosure is applied.

FIGS. 17A through 17C illustrates three forward scan orders for a transform coefficient block (transform block) as an embodiment to which the present disclosure is applied.

FIG. 18 illustrates positions of valid transform coefficients and a forward scan order for each of 4×4 blocks when diagonal scan is applied and 4×4 RST is applied in upper left 4×8 blocks as an embodiment to which the present disclosure is applied.

BEST MODE

Figure 1:
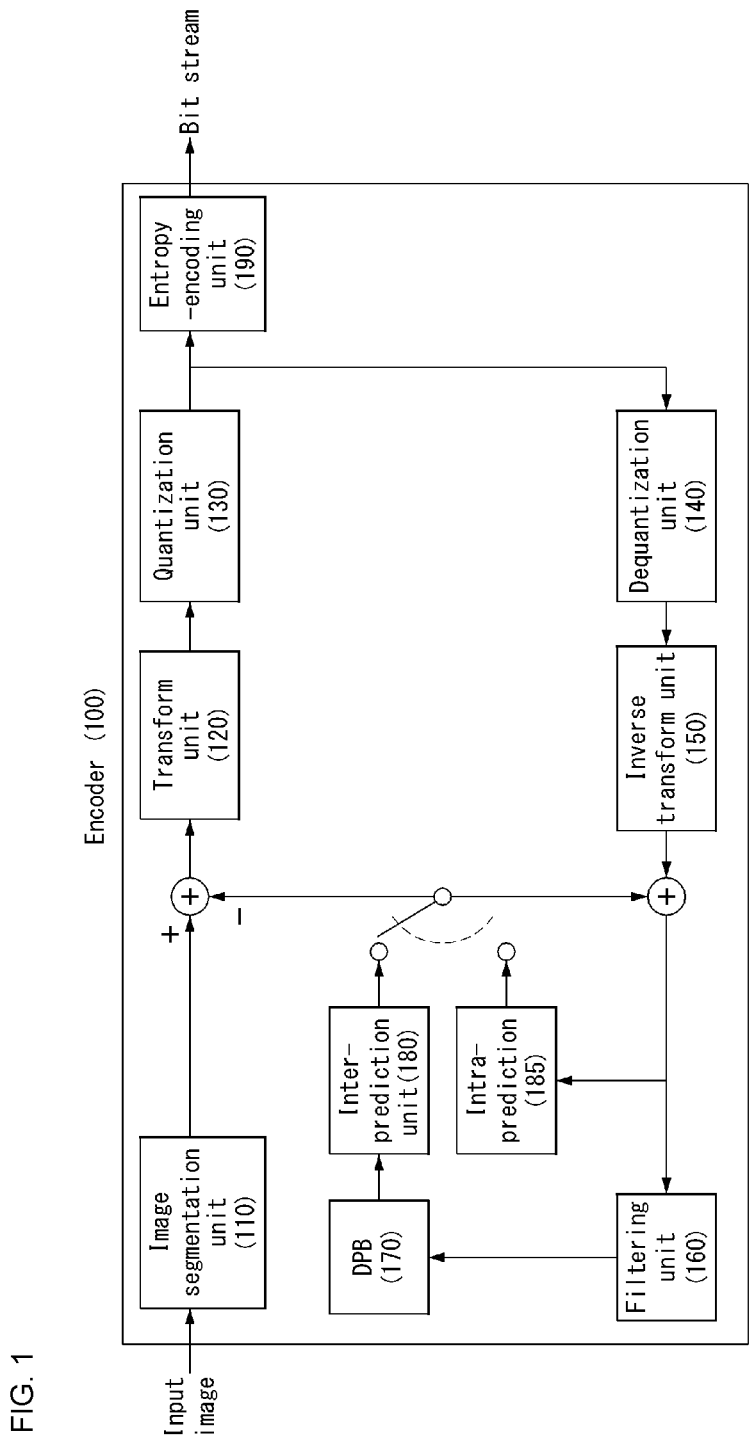
FIG. 1 is a block diagram illustrating the configuration of an encoder for encoding a video signal according to an embodiment of the present disclosure.

The present disclosure provides a method of reconstructing a video signal based on a reduced secondary transform, which includes: obtaining a secondary transform index from the video signal; deriving a secondary transform corresponding to the secondary transform index, wherein the secondary transform represents a reduced secondary transform, and the reduced secondary transform represents a transform outputting L (L<N) transform coefficient data (L×1 transform coefficient vectors) based on inputted N residual data (N×1 residual vectors); obtaining a transform coefficient block by performing an entropy decoding and a dequantization for a current block (N×N); performing an inverse secondary transform for the transform coefficient block using the reduced secondary transform; performing an inverse primary transform for a block which the inverse secondary transform is applied to; and reconstructing the current block using a block which the inverse primary transform is applied to.

The present disclosure is characterized in that the reduced secondary transform is applied to a specific region of the current block, and the specific region is a left-top M×M (M≤N) in the current block.

The present disclosure is characterized in that when the inverse secondary transform is performed, a 4×4 reduced secondary transform is applied to each of divided 4×4 blocks in the current block.

The present disclosure is characterized in that whether the secondary transform index is obtained is determined based on a position of a last non-zero transform coefficient in the transform coefficient block.

The present disclosure is characterized in that when the last non-zero transform coefficient is not located in a specific region, the secondary transform index is obtained, and the specific region represents a remaining region other than a position where a non-zero transform coefficient may exist when transform coefficients are arranged according to a scan order if the reduced secondary transform is applied.

The method further includes: obtaining a primary transform index of the current block from the video signal, wherein the primary transform index corresponds to any one of a plurality of transform combinations configured by a combination of DST7 and/or DCT8; and deriving a transform combination corresponding to the primary transform index, in which the transform combination includes a horizontal transform and a vertical transform, and the horizontal transform and the vertical transform correspond to any one of the DST7 or the DCT8, and the inverse primary transform is performed using the transform combination.

The present disclosure provides an apparatus of reconstructing a video signal based on a reduced secondary transform, which includes: a parsing unit obtaining a secondary transform index from the video signal; a transform unit deriving a secondary transform corresponding to the secondary transform Index, wherein the secondary transform represents a reduced secondary transform, and the reduced secondary transform represents a transform outputting L (L<N) transform coefficient data (L×1 transform coefficient vectors) based on inputted N residual data (N×1 residual vectors); an entropy decoding unit performing an entropy decoding for a current block (N×N); a dequantization unit performing a dequantization for the current block in which the entropy decoding is performed to obtain a transform coefficient block; the transform unit performing an inverse secondary transform for the transform coefficient block using the reduced secondary transform and performing an inverse primary transform and performing an inverse primary transform for a block which the Inverse secondary transform is applied to; and a reconstruction unit reconstructing the current block using a block which the Inverse primary transform is applied to.

DETAILED DESCRIPTION

Hereinafter, a configuration and operation of an embodiment of the present disclosure will be described in detail with reference to the accompanying drawings, a configuration and operation of the present disclosure described with reference to the drawings are described as an embodiment, and the scope, a core configuration, and operation of the present disclosure are not limited thereto.

Further, terms used in the present disclosure are selected from currently widely used general terms, but in a specific case, randomly selected terms by an applicant are used. In such a case, in a detailed description of a corresponding portion, because a meaning thereof is clearly described, the terms should not be simply construed with only a name of terms used in a description of the present disclosure and a meaning of the corresponding term should be comprehended and construed.

Further, when there is a general term selected for describing the invention or another term having a similar meaning, terms used in the present disclosure may be replaced for more appropriate interpretation. For example, in each coding process, a signal, data, a sample, a picture, a frame, and a block may be appropriately replaced and construed. Further, in each coding process, partitioning, decomposition, splitting, and division may be appropriately replaced and construed.

In the present disclosure, Multiple Transform Selection (MTS) may refer to a method for performing transform using at least two transform types. This may also be expressed as an Adaptive Multiple Transform (AMT) or Explicit Multiple Transform (EMT), and likewise, mts_idx may also be expressed as AMT_idx, EMT_idx, tu_mts_idx, AMT_TU_idx, EMT_TU_idx, transform index, or transform combination index and the present disclosure is not limited to the expressions.

FIG. 1 shows a schematic block diagram of an encoder for encoding a video signal, in accordance with one embodiment of the present disclosure.

Referring to FIG. 1, the encoder 100 may include an image segmentation unit 110, a transform unit 120, a quantization unit 130, a dequantization unit 140, an inverse transform unit 150, a filtering unit 160, a decoded picture buffer (DPB) 170, an inter-prediction unit 180, an intra-predictor 185 and an entropy encoding unit 190.

The image segmentation unit 110 may segment an input image (or a picture or frame), input to the encoder 100, into one or more processing units. For example, the process unit may be a coding tree unit (CTU), a coding unit (CU), a prediction unit (PU), or a transform unit (TU).

However, the terms are used only for convenience of illustration of the present disclosure, the present disclosure is not limited to the definitions of the terms. In the present disclosure, for convenience of illustration, the term "coding unit" is employed as a unit used in a process of encoding or decoding a video signal, however, the present disclosure is not limited thereto, another process unit may be appropriately selected based on contents of the present disclosure.

The encoder 100 may generate a residual signal by subtracting a prediction signal output from the inter prediction unit 180 or intra prediction unit 185 from the input image signal. The generated residual signal may be transmitted to the transform unit 120.

The transform unit 120 may generate a transform coefficient by applying a transform scheme to a residual signal. The transform process may be applied a block (square or rectangle) split by a square block of a quadtree structure or a binarytree structure, a ternary structure or an asymmetric structure.

The transform unit 120 may perform a transform based on a plurality of transforms (or transform combinations), and the transform scheme may be referred to as multiple transform selection (MTS). The MTS may also be referred to as an Adaptive Multiple Transform (AMT) or an Enhanced Multiple Transform (EMT).

The MTS (or AMT or EMT) may refer to a transform scheme performed based on a transform (or transform combinations) adaptively selected from the plurality of transforms (or transform combinations).

The plurality of transforms (or transform combinations) may include the transforms (or transform combinations) described in FIG. 6 of the present disclosure. In the present disclosure, the transform or transform type may be expressed as, for example, DCT-Type 2, DCT-II, DCT2, or DCT-2.

The transform unit 120 may perform the following embodiments.

The present disclosure provides a method for designing an RST that may be applied to a 4×4 block.

The present disclosure provides a configuration of a region to which the 4×4 RST is to be applied, a method for arranging transform coefficients generated after applying the 4×4 RST, a scan order of the arranged transform coefficients, a method for sorting and combining transform coefficients generated for each block, and the like.

The present disclosure provides a method for coding a transform index that specifies the 4×4 RST.

The present disclosure provides a method for conditionally coding a corresponding transform index by checking whether a non-zero transform coefficient exists in an unacceptable region when applying the 4×4 RST.

The present disclosure provides a method for conditionally coding the corresponding transform index after coding a last non-zero transform coefficient position, and then omitting relevant residual coding for positions that are not accepted.

The present disclosure provides a method for applying different transform index coding and residual coding to a luma block and a chroma block when applying the 4×4 RST.

Detailed embodiments thereof will be described in more detail in the present disclosure.

The quantization unit 130 may quantize the transform coefficient and transmits the quantized transform coefficient to the entropy encoding unit 190 and the entropy encoding unit 190 may entropy-code a quantized signal and output the entropy-coded quantized signal as a bitstream.

Although the transform unit 120 and the quantization unit 130 are described as separate functional units, the present disclosure is not limited thereto and may be combined into one functional unit. The dequantization unit 140 and the inverse transform unit 150 may also be similarly combined into one functional unit.

A quantized signal output from the quantization unit 130 may be used for generating the prediction signal. For example, inverse quantization and inverse transform are applied to the quantized signal through the dequantization unit 140 and the inverse transform unit 1850 in a loop to reconstruct the residual signal. The reconstructed residual signal is added to the prediction signal output from the inter-prediction unit 180 or the intra-prediction unit 185 to generate a reconstructed signal.

Meanwhile, deterioration in which a block boundary is shown may occur due to a quantization error which occurs during such a compression process. Such a phenomenon is referred to as blocking artifacts and this is one of key elements for evaluating an image quality. A filtering process may be performed in order to reduce the deterioration. Blocking deterioration is removed and an error for the current picture is reduced through the filtering process to enhance the image quality.

The filtering unit 160 applies filtering to the reconstructed signal and outputs the applied reconstructed signal to a reproduction device or transmits the output reconstructed signal to the decoded picture buffer 170. The inter-prediction unit 170 may use the filtered signal transmitted to the decoded picture buffer 180 as the reference picture. As such, the filtered picture is used as the reference picture in the inter prediction mode to enhance the image quality and the encoding efficiency.

The decoded picture buffer 170 may store the filtered picture in order to use the filtered picture as the reference picture in the inter-prediction unit 180.

The inter-prediction unit 180 performs a temporal prediction and/or spatial prediction in order to remove temporal redundancy and/or spatial redundancy by referring to the reconstructed picture. Here, since the reference picture used for prediction is a transformed signal that is quantized and dequantized in units of the block at the time of encoding/decoding in the previous time, blocking artifacts or ringing artifacts may exist.

Accordingly, the inter-prediction unit 180 may interpolate a signal between pixels in units of a sub-pixel by applying a low-pass filter in order to solve performance degradation due to discontinuity or quantization of such a signal. Here, the sub-pixel means a virtual pixel generated by applying an interpolation filter and an integer pixel means an actual pixel which exists in the reconstructed picture. As an interpolation method, linear interpolation, bi-linear interpolation, wiener filter, and the like may be adopted.

An Interpolation filter is applied to the reconstructed picture to enhance precision of prediction. For example, the inter-prediction unit 180 applies the interpolation filter to the Integer pixel to generate an interpolated pixel and the prediction may be performed by using an interpolated block constituted by the interpolated pixels as the prediction block.

Meanwhile, the intra-prediction unit 185 may predict the current block by referring to samples in the vicinity of a block which is to be subjected to current encoding. The intra-prediction unit 185 may perform the following process in order to perform the intra prediction. First, a reference sample may be prepared, which is required for generating the prediction signal. In addition, the prediction signal may be generated by using the prepared reference sample. Thereafter, the prediction mode is encoded. In this case, the reference sample may be prepared through reference sample padding and/or reference sample filtering. Since the reference sample is subjected to prediction and reconstruction processes, a quantization error may exist. Accordingly, a reference sample filtering process may be performed with respect to each prediction mode used for the intra prediction in order to reduce such an error.

The prediction signal generated through the inter-prediction unit 180 or the intra-prediction unit 185 may be used for generating the reconstructed signal or used for generating the residual signal.

Figure 2:
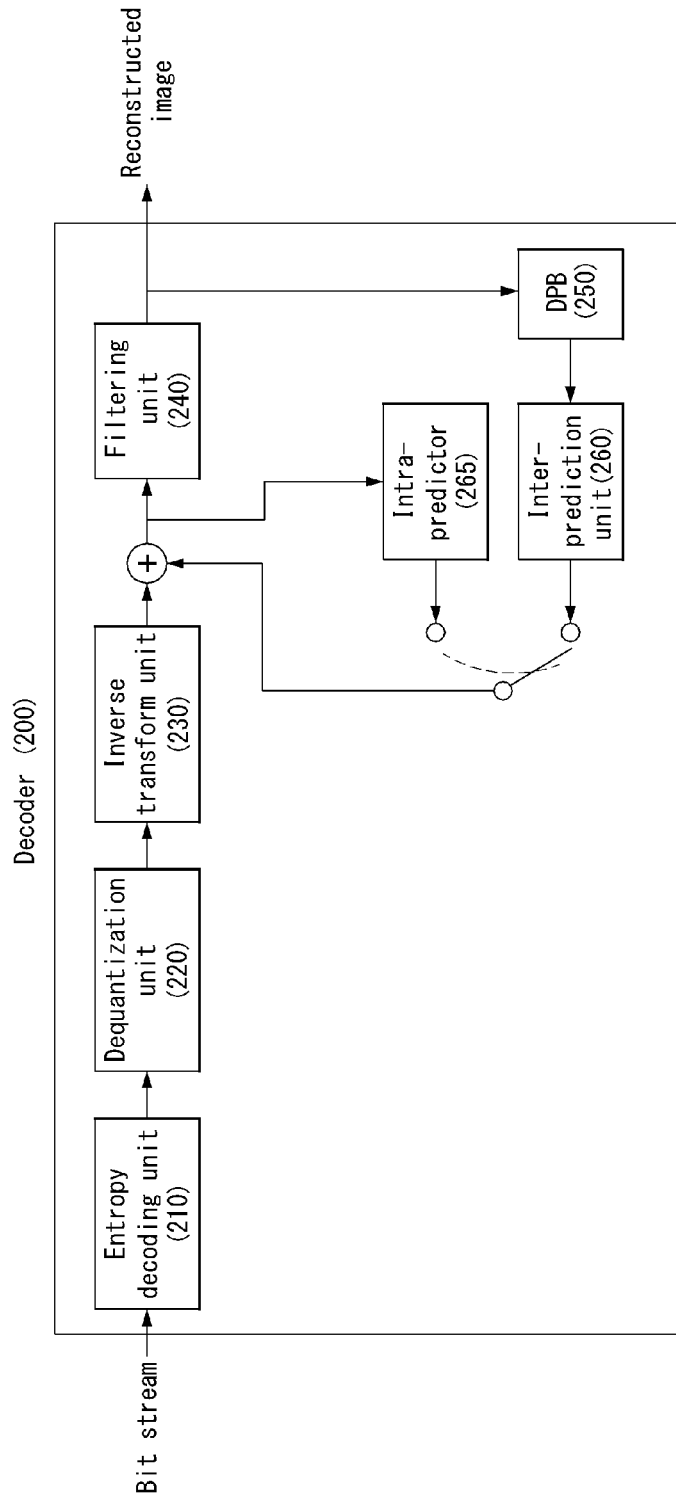
FIG. 2 is a block diagram illustrating the configuration of a decoder for decoding a video signal according to an embodiment of the present disclosure.

FIG. 2 is a schematic block diagram of a decoder in which decoding of a video signal is performed as an embodiment to which the present disclosure is applied.

Referring to FIG. 2, the decoder 200 may be configured to include a parsing unit (not illustrated), an entropy decoding unit 210, a dequantization unit 220, an inverse transform unit 230, a filtering unit 240, a decoded picture buffer (DPB) unit 250, an inter-prediction unit 260, and an intra-prediction unit 265.

In addition, a reconstructed video signal output through the decoder 200 may be reproduced through a reproduction device.

The decoder 200 may receive the signal output from the encoder 100 of FIG. 1 and the received signal may be entropy-decoded through the entropy decoding unit 210.

The dequantization unit 220 obtains the transform coefficient from an entropy-decoded signal by using quantization step size information.

The inverse transform unit 230 inversely transforms the transform coefficient to obtain the residual signal.

Here, the present disclosure provides a method for configuring a transform combination for each transform configuration group divided by at least one of a prediction mode, a block size or a block shape and the inverse transform unit 230 may perform inverse transform based on the transform combination configured by the present disclosure. Further, the embodiments described in the present disclosure may be applied.

The inverse transform unit 230 may perform the following embodiments.

The present disclosure provides a method for reconstructing the video signal based on reduced secondary transform.

The inverse transform unit 230 may derive a secondary transform corresponding to a secondary transform index, perform inverse secondary transform for the transform coefficient block by using the secondary transform, and perform inverse primary transform for the block in which the inverse secondary transform is performed. Here, the secondary transform refers to the reduced secondary transform and the reduced secondary transform represents a transform in which N residual data (N×1 residual vectors) are input to output L (L<N) transform coefficient data (L×1 transform coefficient vectors).

The present disclosure is characterized in that the reduced secondary transform is applied to a specific region of the current block and the specific region is an upper left M×M (M≤N) in the current block.

The present disclosure is characterized in that 4×4 reduced secondary transform is applied to each of 4×4 blocks divided in the current blocks when the inverse secondary transform is performed.

The present disclosure is characterized in that it is determined whether the secondary transform index is obtained based on the position of the last non-zero transform coefficient in the transform coefficient block.

The present disclosure is characterized in that when the last non-zero transform coefficient is not positioned in the specific region, the secondary transform index is obtained and the specific region indicates remaining regions other than a position when the non-zero transform coefficient may exist when the transform coefficients are arranged according to the scan order in the case where the reduced secondary transform is applied.

The inverse transform unit 230 may derive a transform combination corresponding to a primary transform index and perform an inverse primary transform by using the transform combination. Here, the primary transform index corresponds to any one of a plurality of transform combinations constituted by a combination of DST7 and/or DCT8 and the transform combination includes a horizontal transform and a vertical transform. In this case, the horizontal transform and the vertical transform correspond to either the DST7 or the DCT8.

The dequantization unit 220 and the transform unit 230 are described as separate function units, but the disclosure is not limited thereto. The dequantization unit 220 and the transform unit 230 may be combined into a single function unit.

A reconstructed signal is generated by adding the obtained residual signal to a prediction signal output by the inter prediction unit 260 or the intra prediction unit 265.

The filter 240 may output or transmit the reconstructed signal to a playback device or the decoded picture buffer unit 250 by applying filtering to the reconstructed signal. The filtered signal transmitted to the decoded picture buffer unit 250 may be used as a reference picture in the inter prediction unit 260.

In the disclosure, the embodiments described in the transform unit 120 and each function unit of the encoder 100 may be identically applied to the transform unit 230 and corresponding function unit of the decoder.

Figure 3A:
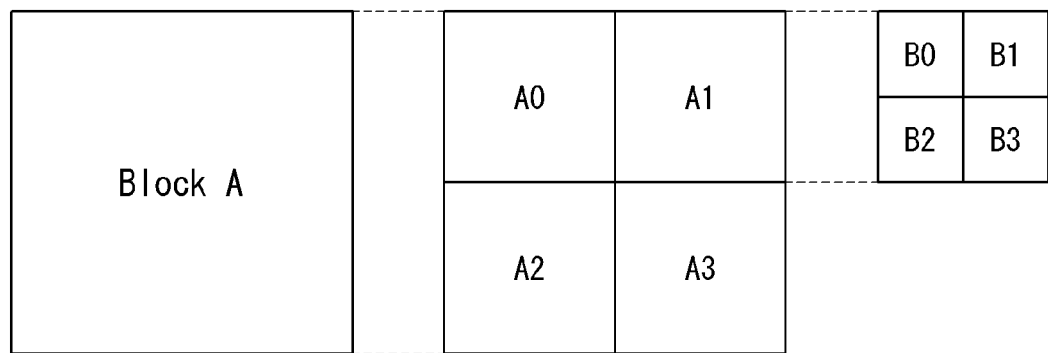
FIGS. 3A though 3D illustrate embodiments to which the disclosure may be applied.
Figure 3B:
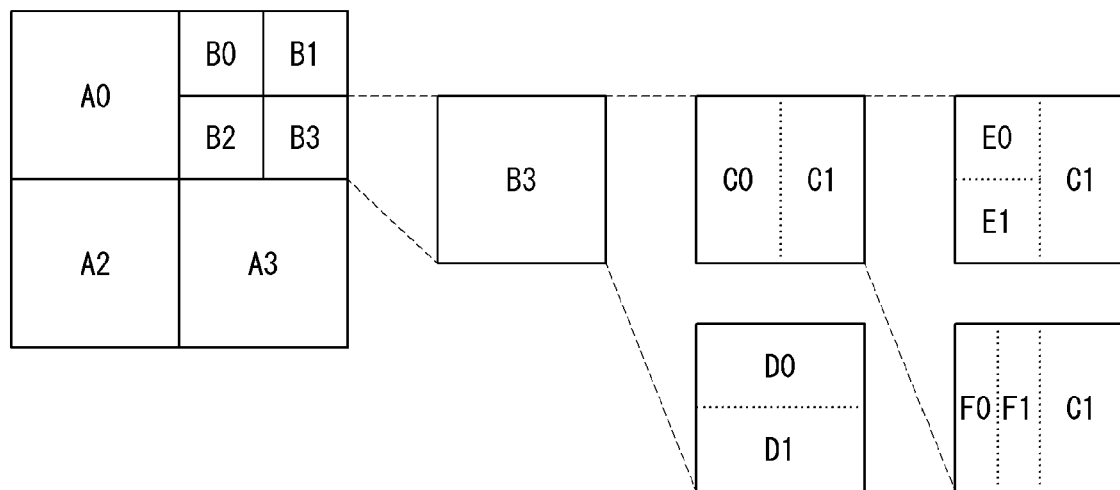
FIG. 3B is a diagram for describing a block split structure based on a binary tree (hereinafter referred to as a "BT")
Figure 3C:
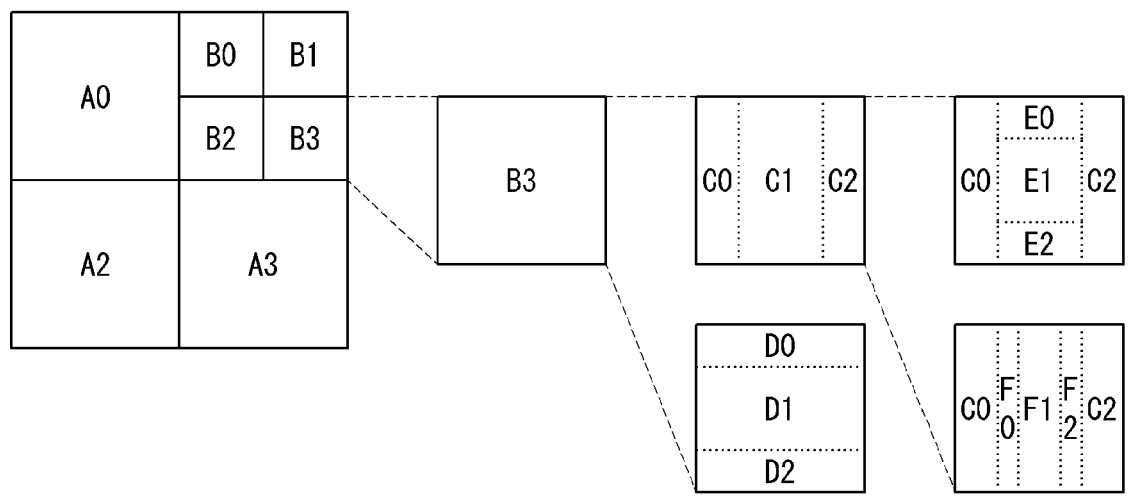
FIG. 3C is a diagram for describing a block split structure based on a ternary tree (hereinafter referred to as a "TT")
Figure 3D:
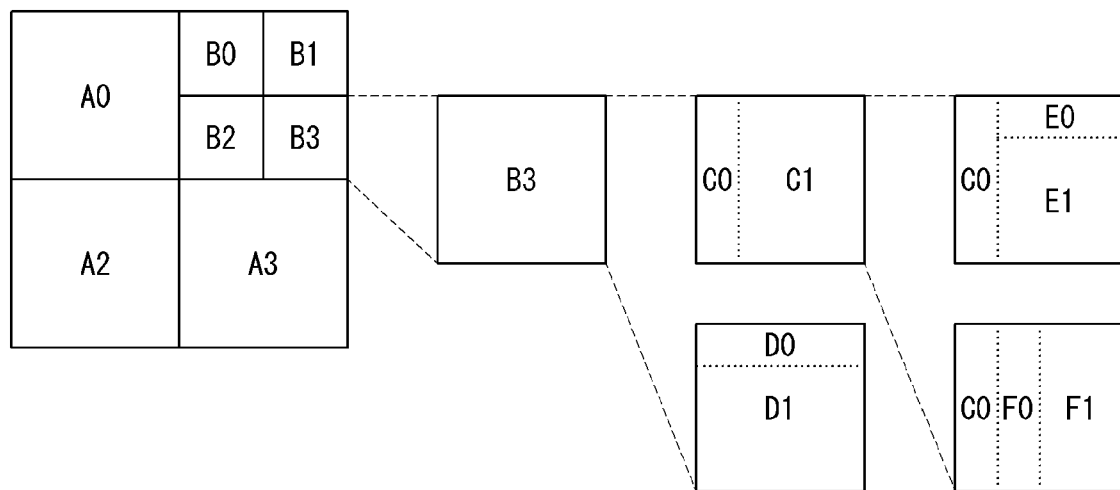
FIG. 3D is a diagram for describing a block split structure based on an asymmetric tree (hereinafter referred to as an "AT").

FIGS. 3A through 3D illustrate embodiments to which the disclosure may be applied, FIG. 3A is a diagram for describing a block split structure based on a quadtree (hereinafter referred to as a "QT"), FIG. 3B is a diagram for describing a block split structure based on a binary tree (hereinafter referred to as a "BT"), FIG. 3C is a diagram for describing a block split structure based on a ternary tree (hereinafter referred to as a "TT"), and FIG. 3D is a diagram for describing a block split structure based on an asymmetric tree (hereinafter referred to as an "AT").

In video coding, one block may be split based on a quadtree (QT). Furthermore, one subblock split by the QT may be further split recursively using the QT. A leaf block that is no longer QT split may be split using at least one method of a binary tree (BT), a ternary tree (TT) or an asymmetric tree (AT). The BT may have two types of splits of a horizontal BT (2N×N, 2N×N) and a vertical BT (N×2N, N×2N). The TT may have two types of splits of a horizontal TT (2N×1/2N, 2N×N, 2N×1/2N) and a vertical TT (1/2N×2N, N×2N, 1/2N×2N). The AT may have four types of splits of a horizontal-up AT (2N×1/2N, 2N×3/2N), a horizontal-down AT (2N×3/2N, 2N×1/2N), a vertical-left AT (1/2N×2N, 3/2N×2N), and a vertical-right AT (3/2N×2N, 1/2N×2N). Each BT, TT, or AT may be further split recursively using the BT, TT, or AT.

FIG. 3A shows an example of a QT split. A block A may be split into four subblocks A0, A1, A2, and A3 by a QT. The subblock A1 may be split into four subblocks B0, B1, B2, and B3 by a QT.

FIG. 3B shows an example of a BT split. A block B3 that is no longer split by a QT may be split into vertical BTs C0 and C1 or horizontal BTs D0 and D1. As in the block C0, each subblock may be further split recursively like the form of horizontal BTs E0 and E1 or vertical BTs F0 and F1.

FIG. 3C shows an example of a TT split. A block B3 that is no longer split by a QT may be split into vertical TTs C0, C1, and C2 or horizontal TTs D0, D1, and D2. As in the block C1, each subblock may be further split recursively like the form of horizontal TTs E0, E1, and E2 or vertical TTs F0, F1, and F2.

FIG. 3D shows an example of an AT split. A block B3 that is no longer split by a QT may be split into vertical ATs C0 and C1 or horizontal ATs D0 and D1. As in the block C1, each subblock may be further split recursively like the form of horizontal ATs E0 and E1 or vertical TTs F0 and F1.

Meanwhile, BT, TT, and AT splits may be split together. For example, a subblock split by a BT may be split by a TT or AT. Furthermore, a subblock split by a TT may be split by a BT or AT. A subblock split by an AT may be split by a BT or TT. For example, after a horizontal BT split, each subblock may be split into vertical BTs or after a vertical BT split, each subblock may be split into horizontal BTs. The two types of split methods are different in a split sequence, but have the same finally split shape.

Furthermore, if a block is split, the sequence that the block is searched may be defined in various ways. In general, the search is performed from left to right or from top to bottom. To search a block may mean a sequence for determining whether to split an additional block of each split subblock or may mean a coding sequence of each subblock if a block is no longer split or may mean a search sequence when information of another neighbor block is referred in a subblock.

Figure 4:
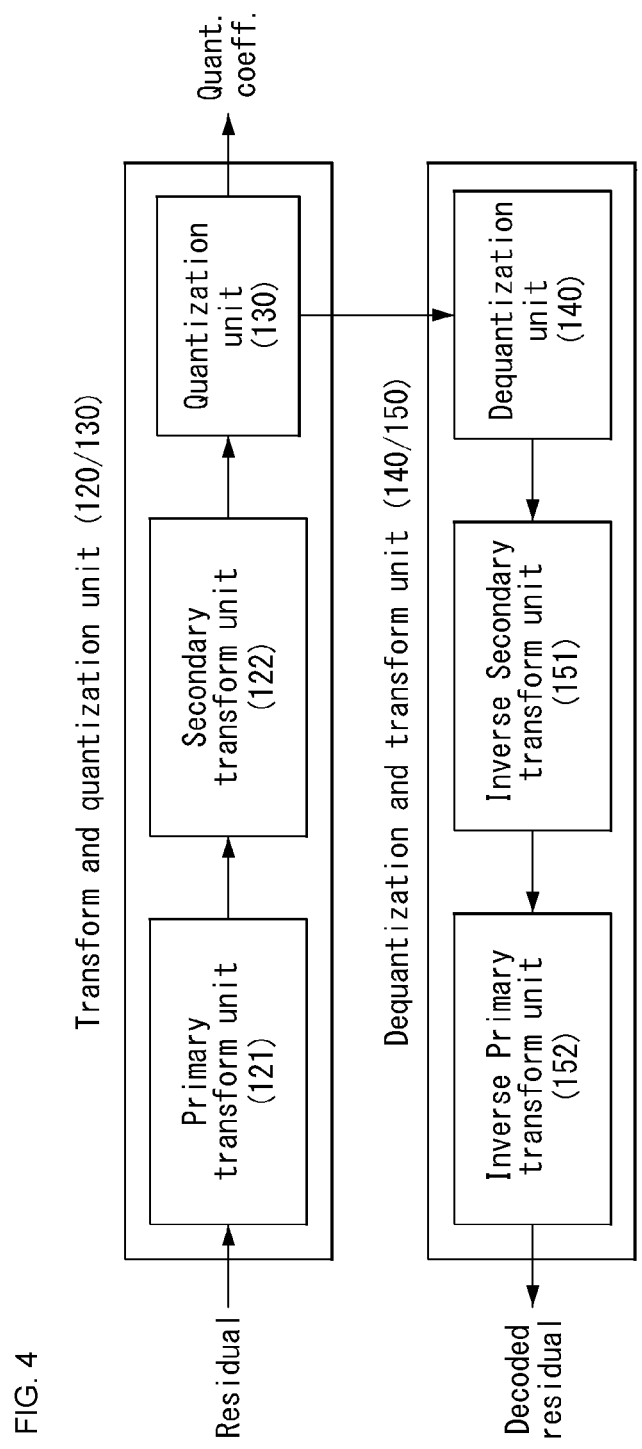
FIG. 4 is an embodiment to which the disclosure is applied and illustrates a schematic block diagram of a transform and quantization unit 120/130 and a dequantization and transform unit 140/150 within an encoder.
Figure 5:
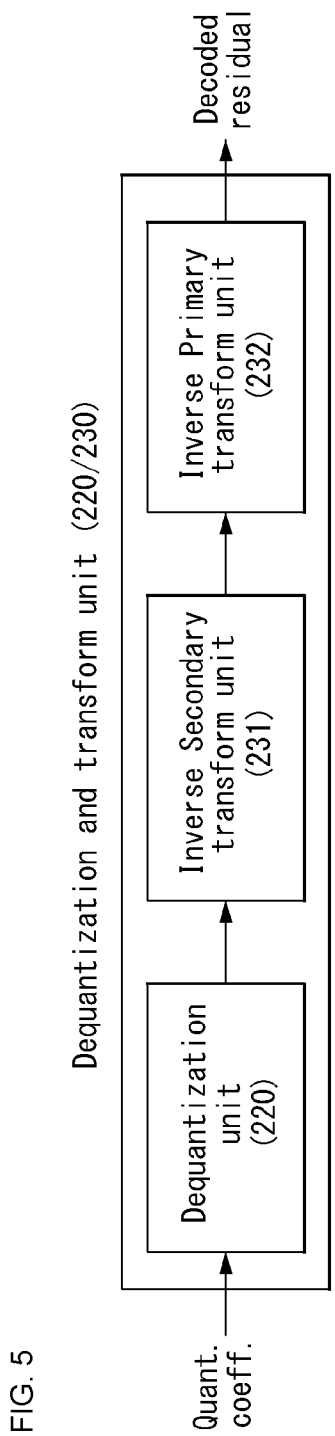
FIG. 5 is an embodiment to which the disclosure is applied and illustrates a schematic block diagram of a dequantization and transform unit 220/230 within a decoder.

FIGS. 4 and 5 are embodiments to which the disclosure is applied. FIG. 4 illustrates a schematic block diagram of a transform and quantization unit 120/130 and a dequantization and transform unit 140/150 within the encoder, and FIG. 5 illustrates a schematic block diagram of a dequantization and transform unit 220/230 within the decoder.

Referring to FIG. 4, the transform and quantization unit 120/130 may include a primary transform unit 121, a secondary transform unit 122 and the quantization unit 130. The dequantization and transform unit 140/150 may include the dequantization unit 140, an inverse secondary transform unit 151 and an inverse primary transform unit 152.

Referring to FIG. 5, the dequantization and transform unit 220/230 may include the dequantization unit 220, an inverse secondary transform unit 231 and an Inverse primary transform unit 232.

In the disclosure, when a transform is performed, the transform may be performed through a plurality of steps. For example, as in FIG. 4, two steps of a primary transform and a secondary transform may be applied or more transform steps may be used according to an algorithm. In this case, the primary transform may be referred to as a core transform.

The primary transform unit 121 may apply a primary transform on a residual signal. In this case, the primary transform may be pre-defined in a table form in the encoder and/or the decoder.

A discrete cosine transform type 2 (hereinafter "DCT2") may be applied to the primary transform. Alternatively, a discrete sine transform-type 7 (hereinafter called "DST7") may be applied to a specific case. For example, in the intra prediction mode, the DST7 may be applied to a 4×4 block.

Further, the primary transform may adopt combinations of various transforms DST 7, DCT 8, DST 1, and DCT 5 of the multiple transform selection (MTS). For example, FIG. 6 may be adopted.

The secondary transform unit 122 may apply the secondary transform to a primary transformed signal and here, the secondary transform may be predefined in the table in the encoder and/or the decoder.

As an embodiment, the secondary transform may conditionally adopt a non-separable secondary transform (hereinafter, referred to as 'NSST'). For example, the NSST may be applied only to the intra-prediction block and may have a transform set applicable to each prediction mode group.

Here, the prediction mode group may be configured based on symmetry with respect to a prediction direction. For example, since prediction mode 52 and prediction mode 16 are symmetrical based on prediction mode 34 (diagonal direction), the same transform set may be applied by forming one group. In this case, when the transform for prediction mode 52 is applied, input data is transposed and then applied because prediction mode 52 has the same transform set as prediction mode 16.

Meanwhile, since the symmetry for the direction does not exist in the case of a planar mode and a DC mode, each mode has a different transform set and the corresponding transform set may be constituted by two transforms. In respect to the remaining direction modes, each transform set may be constituted by three transforms.

As another embodiment, the secondary transform may adopt combinations of various transforms DST 7, DCT 8, DST 1, and DCT 5 of the multiple transform selection (MTS). For example, FIG. 6 may be adopted.

As another embodiment, the DST 7 may be applied to the secondary transform.

As another embodiment, the NSST may not be applied to the entire primary transformed block but may be applied only to a top-left 8×8 region. For example, when the block size is 8×8 or more, 8×8 NSST is applied and when the block size is less than 8×8, 4×4 NSST is applied and in this case, the block is divided into 4×4 blocks and then, the 4×4 NSST is applied to each of the divided blocks.

As another embodiment, even in the case of 4×N/N×4 (N>=16), the 4×4 NSST may be applied.

The NSST, the 4×4 NSST, and the 8×8 NSST will be described in more detail with reference to FIGS. 12 to 15 and other embodiments in the present disclosure.

The quantization unit 130 may perform quantization for the secondary transformed signal.

The dequantization and inverse transform units 140 and 150 perform the above-described process in reverse, and a redundant description thereof will be omitted.

FIG. 5 is a schematic block diagram of a dequantization unit 220 and an inverse transform unit 230 in a decoder.

Referring to FIG. 5 above, the dequantization and inverse transform units 220 and 230 may include a dequantization unit 220, an inverse secondary transform unit 231, and an inverse primary transform unit 232.

The dequantization unit 220 obtains the transform coefficient from an entropy-decoded signal by using quantization step size information.

The inverse secondary transform unit 231 performs an inverse secondary transform for the transform coefficients. Here, the inverse secondary transform represents an inverse transform of the secondary transform described in FIG. 4 above.

As another embodiment, the secondary transform may adopt combinations of various transforms DST 7, DCT 8, DST 1, and DCT 5 of the multiple transform selection (MTS). For example, FIG. 6 may be adopted.

The inverse primary transform unit 232 performs an inverse primary transform for the inverse secondary transformed signal (or block) and obtains the residual signal. Here, the inverse primary transform represents the inverse transform of the primary transform described in FIG. 4.

As an embodiment, the primary transform may adopt combinations of various transforms DST 7, DCT 8, DST 1, and DCT 5 of the multiple transform selection (MTS). For example, FIG. 6 may be adopted.

As an embodiment of the present disclosure, the DST 7 may be applied to the primary transform.

As an embodiment of the present disclosure, the DCT 8 may be applied to the primary transform.

The present disclosure provides a method for configuring a transform combination for each transform configuration group divided by at least one of a prediction mode, a block size or a block shape and the inverse primary transform unit 232 may perform the inverse transform based on the transform combination configured by the present disclosure. Further, the embodiments described in the present disclosure may be applied.

FIG. 6 is a table showing a transform configuration group to which Multiple Transform Selection (MTS) is applied as an embodiment to which the present disclosure is applied.

Transform configuration group to which Multiple Transform Selection (MTS) is applied In the present disclosure, a j-th transform combination candidate for transform configuration group $G_i$ is represented by a pair shown in Equation 1 below.

$$(H(G_i,j), V(G_i,j)) \quad [\text{Equation 1}]$$

Here, $H(G_i, j)$ indicates the horizontal transform for the j-th candidate, and $V(Gi, j)$ indicates the vertical transform for the j-th candidate. For example, in FIG. 6, $H(G_3, 2)$=DST7, $V(G_3, 2)$=DCT8 may be represented. Depending on a context, a value assigned to $H(G_i, j)$ or $V(G_i, j)$ may be a nominal value to distinguish transformations, as in the example above or may be an index value indicating the transform or may be a 2 dimensional (D) matrix for the transform.

Further, in the present disclosure, a 2D matrix value for DCT and DST may be represented as shown in Equation 2 and 3 below.

$$\text{DCT type 2: } C_N^{II}, \text{DCT type 8: } C_N^{VIII} \quad [\text{Equation 2}]$$

$$\text{DST type 7: } S_N^{VII}, \text{DST type 4: } S_N^{IV} \quad [\text{Equation 3}]$$

Here, whether the transform is DST or DCT is represented by S or C, a type number is represented by a superposition in the form of Roman numbers and N of a subscript indicates that the transform is an N×N transform. Further, 2D matrixes such as the $C_N^{II}$ and $S_N^{IV}$ assume that column vectors form a transform basis.

Referring to FIG. 6 above, the transform configuration groups may be determined based on the prediction mode and the number of groups may be a total of six groups G0 to G5. In addition, G0 to G4 correspond to a case where intra prediction is applied, and G5 represents transform combinations (or transform sets and transform combination sets) applied to the residual block generated by the inter prediction.

One transform combination may be constituted by a horizontal transform (or row transform) applied to rows of a corresponding 2D block and a vertical transform (or column transform) applied to columns.

Here, each of all of the transform configuration groups may have four transform combination candidates. The four transform combinations may be selected or determined through transform combination indexes of 0 to 3 and the transform combination index may be encoded and transmitted from the encoder to the decoder.

As an embodiment, the residual data (or residual signal) obtained through the intra prediction may have different statistical characteristics according to the intra prediction mode. Therefore, as illustrated in FIG. 6, transforms other than a general cosine transform may be applied to each intra prediction mode.

Referring to FIG. 6 above, a case of using 35 intra prediction modes and a case of using 67 intra prediction modes are illustrated. A plurality of transform combinations may be applied to each transform configuration group divided in each intra prediction mode column. For example, the plurality of transform combinations may be constituted by four (row direction transforms and column direction transforms) combinations. As a specific example, DST-7 and DST-5 may be applied in a row (horizontal) direction and a column (vertical) direction in group 0, and as a result, a total of four combinations are available.

Since a total of transform kernel combinations may be applied to each intra prediction mode, a transform combination index for selecting one of the transform kernel combinations may be transmitted every transform unit. In the present disclosure, the transform combination index may be called MTS index and expressed as mtx_idx.

Further, in addition to the transform kernels presented in FIG. 6 above, a case where DCT2 is optimal for both the row direction and the column direction due to characteristics of the residual signal may occur. Accordingly, the MTS flag is defined for each coding unit to adaptively perform the transform. Here, when the MTS flag is 0, DCT2 may be applied to both the row direction and the column direction and when the MTS flag is 1, one of four combinations may be selected or determined through the MTS index.

As an embodiment, when the MTS flag is 1, if the number of non-zero transform coefficients for one transform unit is not greater than a threshold, the DST-7 may be applied both the row direction and the column direction is not applied without applying the transform kernels of FIG. 6 above. For example, the threshold may be set to 2, which may be set differently based on the block size or the size of the transform unit. This is also applicable to other embodiments in the specification.

As an embodiment, if the number of non-zero transform coefficients is not greater than the threshold by first parsing the transform coefficient values, an additional information transmission amount may be reduced by applying the DST-7 without parsing the MTS index.

As an embodiment, when the MTS flag is 1, if the number of non-zero transform coefficients is greater than the threshold for one transform unit, the MTS index may be parsed and the horizontal transform and the vertical transform may be determined based on the MTS index.

As an embodiment, the MTS may be applied only when both a width and a height of the transform unit is equal to or smaller than 32.

As an embodiment, FIG. 6 above may be preconfigured through off-line training.

As an embodiment, the MTS index may be defined as one index which may simultaneously indicate the horizontal transform and the vertical transform.

Alternatively, the MTS index may separately define a horizontal transform index and a vertical transform index.

As an embodiment, the MTS flag or the MTS index may be defined at at least one level of a sequence, a picture, a slice, a block, a coding unit, a transform unit, or a prediction unit. For example, the MTS flag or the MTS index may be defined at at least one level of a sequence parameter set (SPS), the coding unit, or the transform unit.

As another embodiment, the transform combination (horizontal transform or vertical transform) corresponding to the transform index may be configured without dependence on the MTS flag, the prediction mode, and/or a block shape. For example, the transform combination may be configured by at least one of DCT2, DST7, and/or DCT8. As a specific example, when the transform index is 0, 1, 2, 3, or 4, each transform combination may be (DCT2, DCT2), (DST7, DST7), (DCT8, DST7), (DST7, DCT8), or (DCT8, DCT8).

Figure 7:
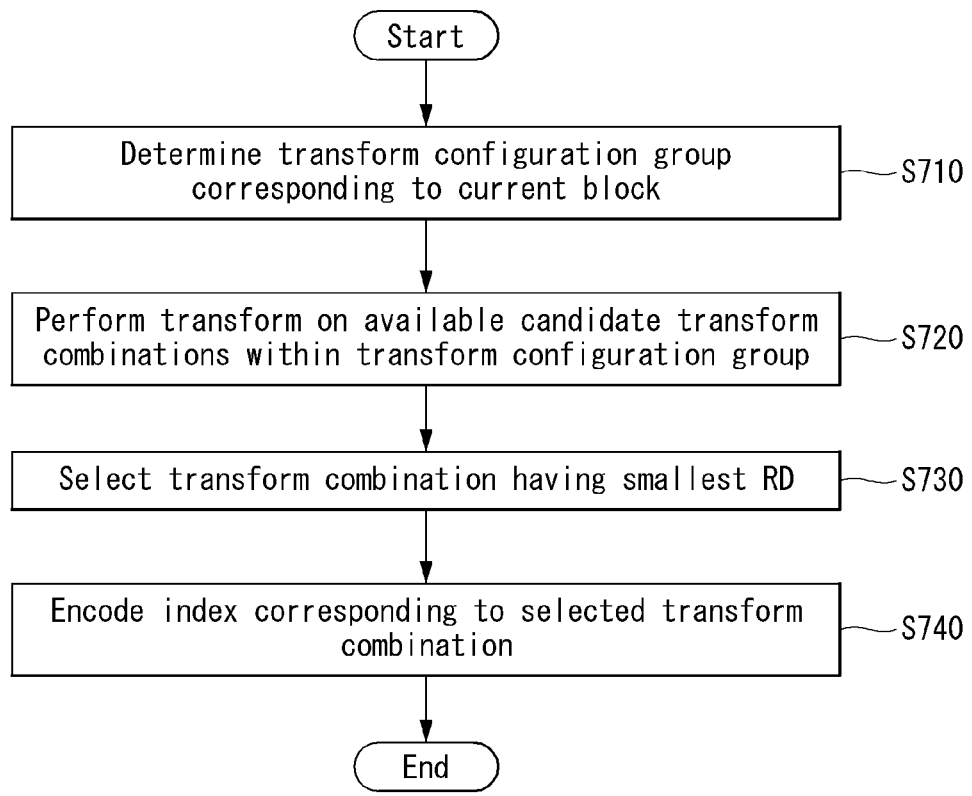
FIG. 7 is a flowchart showing an encoding process in which Multiple Transform Selection (MTS) is performed as an embodiment to which the present disclosure is applied.

FIG. 7 is a flowchart showing an encoding process in which Multiple Transform Selection (MTS) is performed as an embodiment to which the present disclosure is applied.

In the present disclosure, an embodiment in which transforms are a separately applied to the horizontal direction and the vertical direction is basically described, but the transform combination may be configured as non-separable transforms.

Alternatively, the transform combination may be configured by a mixture of separable transforms and non-separable transforms. In this case, when the non-separable transform is used, row/column transform selection or horizontal/vertical direction selection may not be required and only when the separable transform is selected, the transform combinations of FIG. 6 above may be used.

Further, schemes proposed by the present disclosure may be applied regardless of the primary transform or the secondary transform. That is, there is no limit that the schemes should be applied only to any one of both the primary transform and the secondary transform and the schemes may be applied to both the primary transform and the secondary transform. Here, the primary transform may mean a transform for transforming the residual block first and the secondary transform may mean a transform for applying the transform to the block generated as a result of the primary transform.

First, the encoder may determine the transform configuration group corresponding to the current block. Here, the transform configuration group may mean the transform configuration group of FIG. 6 above and the present disclosure is not limited thereto and the transform configuration group may be constituted by other transform combinations.

The encoder may perform a transform for candidate transform combinations available in the transform configuration group (S720).

As a result of performing the transform, the encoder may determine or select a transform combination having a smallest rate distortion (RD) cost (S730).

The encoder may encode the transform combination index corresponding to the selected transform combination (S740).

Figure 8:
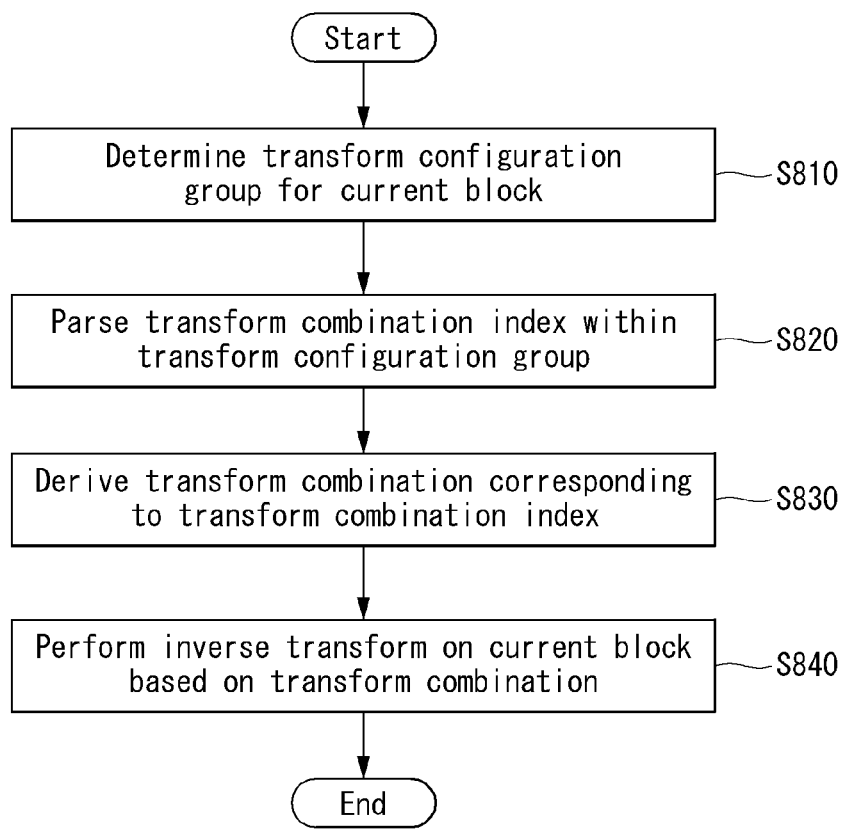
FIG. 8 is a flowchart showing a decoding process in which Multiple Transform Selection (MTS) is performed as an embodiment to which the present disclosure is applied.

FIG. 8 is a flowchart showing a decoding process in which Multiple Transform Selection (MTS) is performed as an embodiment to which the present disclosure is applied.

First, the decoder may determine the transform configuration group for the current block (S810).

The decoder may parse (or obtain) the transform combination index from the video signal and here, the transform combination index may correspond to any one of the plurality of transform combinations in the transform configuration group (S820). For example, the transform configuration group may include Discrete Sine Transform type (DST) 7 and Discrete Cosine Transform type (DST) 8. The transform combination index may be referred to as the MTS index.

As an embodiment, the transform configuration group may be configured based on at least one of the prediction mode, the block size, or the block shape of the current block.

The decoder may derive the transform combination corresponding to the transform combination index (S830). Here, the transform combination may include the horizontal transform and the vertical transform, and may include at least one of the DST-7 or the DCT-8.

Further, the transform combination may mean the transform combination described in FIG. 6 above, but the present disclosure is not limited thereto. That is, the transform combination may be configured by other transform combinations depending on other embodiments in the present disclosure.

The decoder may perform the inverse transform for the current block based on the transform combination (S840). When the transform combination includes the row (horizontal) transform and the column (vertical) transform, the column (vertical) transform may be applied after applying the row (horizontal) transform first. However, the present disclosure is not limited thereto and the transform order may be reversed or when the transform combination includes the non-separable transforms, the non-separable transform may be immediately applied.

As an embodiment, when the vertical transform or the horizontal transform is the DST-7 or the DCT-8, the inverse transform of the DST-7 or the inverse transform of the DCT-8 may be applied to each row and then applied to each row.

As an embodiment, in respect to the vertical transform or the horizontal transform, different transform may be applied to each row and/or each column.

As an embodiment, the transform combination index may be acquired based on the MTS flag indicating whether the MTS is performed. That is, the transform combination index may be obtained when the MTS is performed according to the MTS flag.

As an embodiment, the decoder may check whether the number of non-zero transform coefficients is greater than the threshold. In this case, the transform combination index may be obtained when the number of non-zero transform coefficients is greater than the threshold.

As an embodiment, the MTS flag or the MTS index may be defined at at least one level of a sequence, a picture, a slice, a block, a coding unit, a transform unit, or a prediction unit.

As an embodiment, the inverse transform may be applied only when both the width and the height of the transform unit is equal to or smaller than 32.

On the other hand, as another embodiment, a process of determining the transform configuration group and a process of parsing the transform combination index may be performed at the same time. Alternatively, step S810 above may be preconfigured and omitted in the encoder and/or the decoder.

Figure 9:
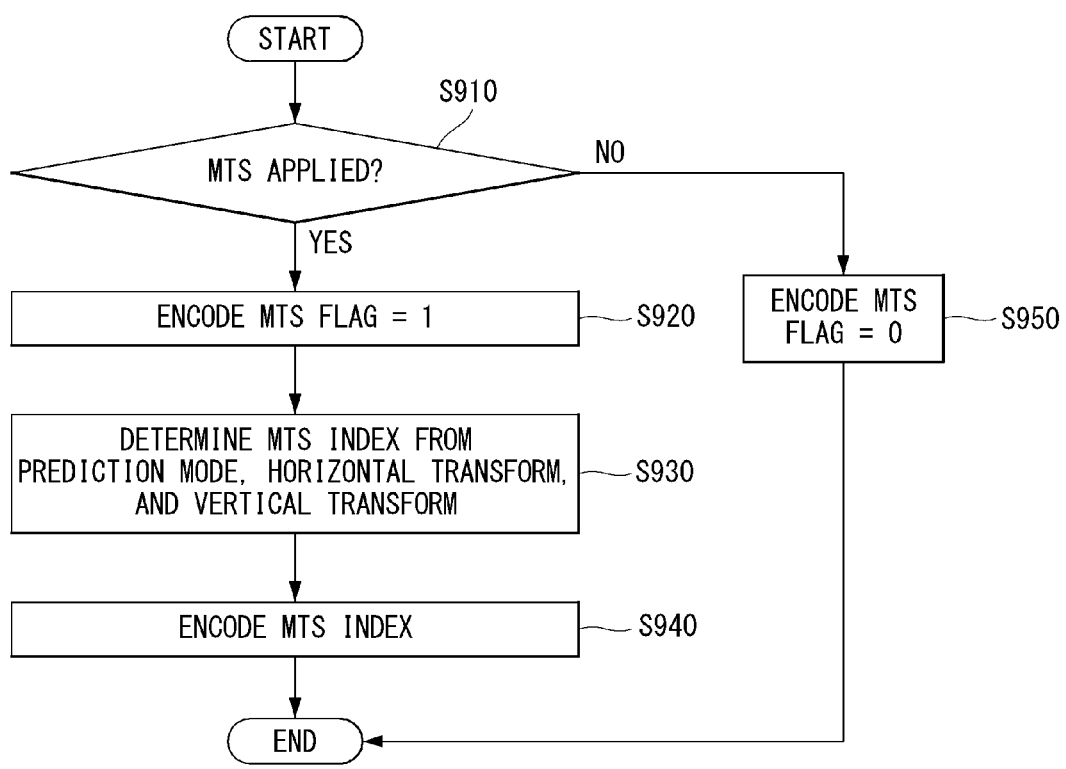
FIG. 9 is a flowchart for describing a process of encoding an MTS flag and an MTS index as an embodiment to which the present disclosure is applied.

FIG. 9 is a flowchart for describing a process of encoding an MTS flag and an MTS index as an embodiment to which the present disclosure is applied.

The encoder may determine whether the Multiple Transform Selection (MTS) is applied to the current block (S910).

When the Multiple Transform Selection (MTS) is applied, the encoder may encode MTS flag=1 (S920).

In addition, the encoder may determine the MTS index based on at least one of the prediction mode, the horizontal transform, and the vertical transform of the current block (S930). Here, the MTS index may mean an index indicating any one of the plurality of transform combinations for each intra prediction mode and the MTS index may be transmitted for each transform unit.

When the MTS Index is determined, the encoder may encode the MTS index (S940).

On the other hand, when the Multiple Transform Selection (MTS) is not applied, the encoder may encode MTS flag=0 (S950).

Figure 10:
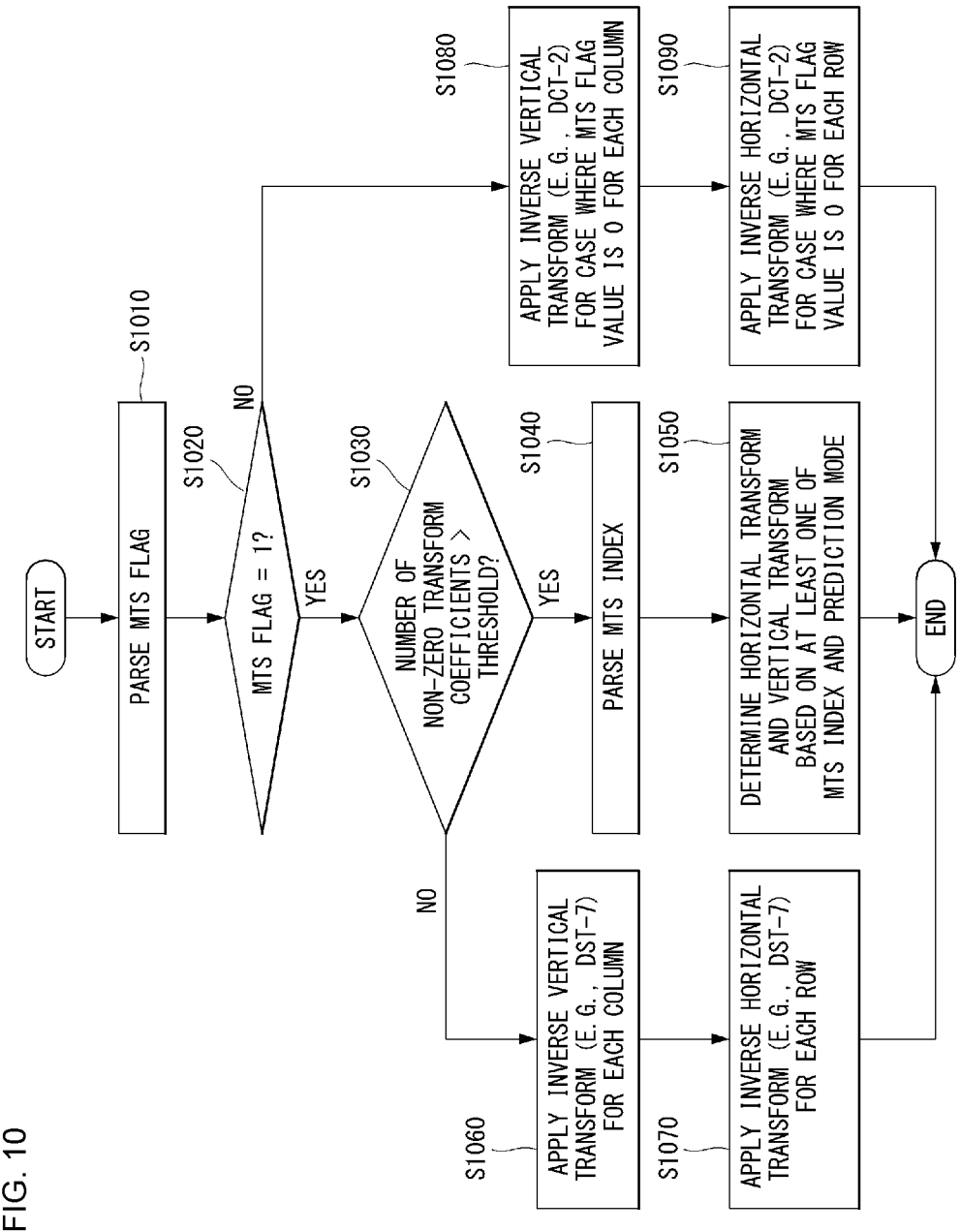
FIG. 10 is a flowchart for describing a decoding process in which horizontal transform or vertical transform is applied to a row or a column based on an MTS flag and an MTS index as an embodiment to which the present disclosure is applied.

FIG. 10 is a flowchart for describing a decoding process in which horizontal transform or vertical transform is applied to a row or a column based on an MTS flag and an MTS index as an embodiment to which the present disclosure is applied.

The decoder may parse the MTS flag from the bitstream (S1010). Here, the MTS flag may indicate whether the Multiple Transform Selection (MTS) is applied to the current block.

The decoder may determine whether the Multiple Transform Selection (MTS) is applied to the current block based on the MTS flag (S1020). For example, it may be checked whether the MTS flag is 1.

When the MTS flag is 1, the decoder may check whether the number of non-zero transform coefficients is greater than (or equal to or greater than) the threshold (S1030). For example, the threshold may be set to 2, which may be set differently based on the block size or the size of the transform unit.

When the number of non-zero transform coefficients is greater than the threshold, the decoder may parse the MTS index (S1040). Here, the MTS index may mean any one of the plurality of transform combinations for each intra prediction mode or inter prediction mode and the MTS index may be transmitted for each transform unit. Alternatively, the MTS index may mean an index indicating any one transform combination defined in a preconfigured transform combination table and here, the preconfigured transform combination table may mean FIG. 6 above, but the present disclosure is limited thereto.

The decoder may derive or determine the horizontal transform and the vertical transform based on at least one of the MTS index and the prediction mode (S1050).

Alternatively, the decoder may derive the transform combination corresponding to the MTS index. For example, the decoder may derive or determine the horizontal transform and the vertical transform corresponding to the MTS index.

Meanwhile, when the number of non-zero transform coefficients is not greater than the threshold, the decoder may apply a preconfigured vertical inverse transform for each column (S1060). For example, the vertical inverse transform may be the inverse transform of the DST7.

In addition, the decoder may apply a preconfigured horizontal inverse transformation for each row (S1070). For example, the horizontal inverse transform may be the inverse transform of the DST7. That is, when the number of non-zero transform coefficients is not greater than the threshold, a transform kernel preconfigured by the encoder or decoder may be used. For example, the transform kernel that is not defined in the transform combination table illustrated in FIG. 6 above, but is widely used may be used.

Meanwhile, when the MTS flag is 0, the decoder may apply the preconfigured vertical inverse transform for each column (S1080). For example, the vertical Inverse transform may be the inverse transform of the DCT2.

In addition, the decoder may apply the preconfigured horizontal inverse transformation for each row (S1090). For example, the horizontal inverse transform may be the inverse transform of the DCT2. That is, when the MTS flag is 0, the transform kernel preconfigured by the encoder or decoder may be used. For example, the transform kernel that is not defined in the transform combination table illustrated in FIG. 6 above, but is widely used may be used.

Figure 11:
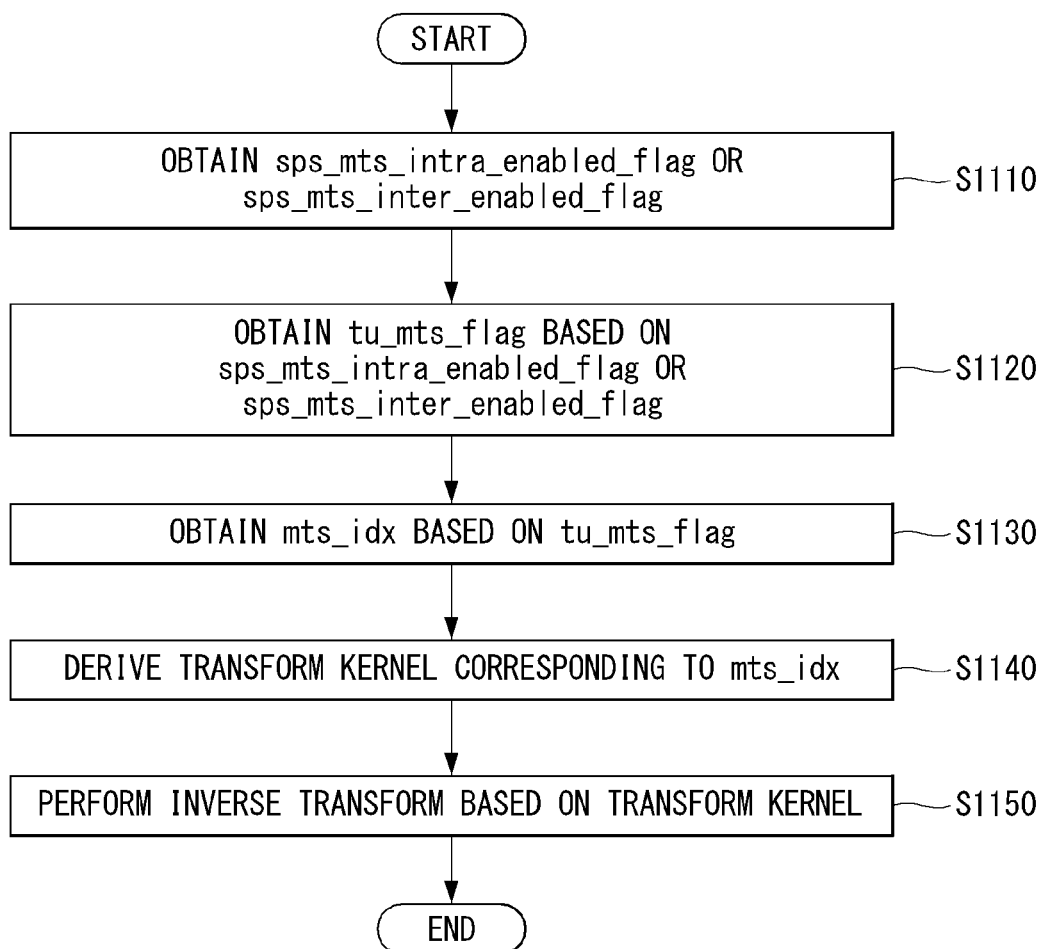
FIG. 11 is a flowchart of performing inverse transform based on a transform related parameter as an embodiment to which the present disclosure is applied.

FIG. 11 is a flowchart of performing inverse transform based on a transform related parameter as an embodiment to which the present disclosure is applied.

The decoder to which the present disclosure is applied may obtain sps_mts_intra_enabled_flag or sps_mts_inter_enabled_flag (S1110). Here, sps_mts_intra_enabled_flag indicates whether tu_mts_flag exists in a residual coding syntax of an intra coding unit. For example, when sps_mts_intra_enabled_flag=0, tu_mts_flag does not exist in the residual coding syntax of the intra coding unit and when sps_mts_intra_enabled_flag=0, tu_mts_flag exists in the residual coding syntax of the intra coding unit. In addition, sps_mts_inter_enabled_flag indicates whether tu_mts_flag exists in the residual coding syntax of the inter coding unit. For example, when sps_mts_inter_enabled_flag=0, tu_mts_flag does not exist in the residual coding syntax of the intra coding unit and when sps_mts_inter_enabled_flag=0, tu_mts_flag exists in the residual coding syntax of the inter coding unit.

The decoder may obtain tu_mts_flag based on sps_mts_intra_enabled_flag or sps_mts_inter_enabled_flag (S1120). For example, when sps_mts_intra_enabled_flag=1 or sps_mts_inter_enabled_flag=1, the decoder may obtain tu_mts_flag. Here, tu_mts_flag indicates whether multiple transform selection (hereinafter, referred to as "MTS") is applied to a residual sample of a luma transform block. For example, when tu_mts_flag=0, the MTS is not applied to the residual sample of the luma transform block and when tu_mts_flag=1, the MTS is applied to the residual sample of the luma transform block.

As another example, at least one of the embodiments of the present document may be applied to the tu_mts_flag.

The decoder may obtain mts_idx based on tu_mts_flag (S1130). For example, when tu_mts_flag=1, the decoder may obtain mts_idx. Here, mts_idx indicates which transform kernel is applied to luma residual samples along the horizontal and/or vertical direction of a current transform block.

For example, at least one of the embodiments of the present document may be applied to mts_idx. As a specific example, at least one of the embodiments of FIG. 6 above may be applied.

The decoder may derive the transform kernel corresponding to mts_idx (S1140). For example, the transform kernel corresponding to the mts_idx may be defined by being divided into the horizontal transform and the vertical transform.

As another example, different transform kernels may be applied to the horizontal transform and the vertical transform. However, the present disclosure is not limited thereto, and the same transform kernel may be applied to the horizontal transform and the vertical transform.

As an embodiment, mts_idx may be defined as shown in Table 1 below.

TABLE 1

| mts_idx[x0][y0] | trTypeHor | trTypeVer |
|---|---|---|
| 0 | 0 | 0 |
| 1 | 1 | 1 |
| 2 | 2 | 1 |
| 3 | 1 | 2 |
| 4 | 2 | 2 |

In addition, the decoder may perform the inverse transform based on the transform kernel (S1150).

As another embodiment of the present disclosure, a decoding process of performing the transform process is described.

The decoder may check a transform size nTbS (S10). Here, the transform size nTbS may be a variable representing a horizontal sample size of scaled transform coefficients.

The decoder may check a transform kernel type trType (S20). Here, the transform kernel type trType may be a variable representing the type of transform kernel and various embodiments of the present disclosure may be applied. The transform kernel type trType may include a horizontal transform kernel type trTypeHor and a vertical transform kernel type trTypeVer.

Referring to Table 1 above, when the transform kernel type trType is 0, the transform kernel type may represent DCT2, when the transform kernel type trType is 1, the transform kernel type may represent DST7, and when the transform kernel type trType is 2, the transform kernel type may represent DCT8.

The decoder may perform a transform matrix multiplication based on at least one of the transform size nTbS or the transform kernel type (S30).

As another example, when the transform kernel type is 1 and the transform size is 4, a predetermined transform matrix 1 may be applied when performing the transform matrix multiplication.

As another example, when the transform kernel type is 1 and the transform size is 8, a predetermined transform matrix 2 may be applied when performing the transform matrix multiplication.

As another example, when the transform kernel type is 1 and the transform size is 16, a predetermined transform matrix 3 may be applied when performing the transform matrix multiplication.

As another example, when the transform kernel type is 1 and the transform size is 32, a predefined transform matrix 4 may be applied when performing the transform matrix multiplication.

Similarly, when the transform kernel type is 2 and the transform size is 4, 8, 16, or 32, predefined transform matrices 5, 6, 7, and 8 may be applied, respectively.

Here, each of the predefined transform matrices 1 to 8 may correspond to any one of various types of transform matrices. As an example, the transform matrix of the type illustrated in FIG. 6 above may be applied.

The decoder may derive a transform sample based on transform matrix multiplication (S40).

Each of the above embodiments may be used, but the present disclosure is not limited thereto, and may be used in combination with the above embodiments and other embodiments of the present disclosure.

FIG. 12 is a table showing allocation of a transform set for each intra prediction mode in an NSST as an embodiment to which the present disclosure is applied.

Non-Separable Secondary Transform (NSST)

The secondary transform unit may apply the secondary transform to a primary transformed signal and here, the secondary transform may be defined in the table in the encoder and/or the decoder.

As an embodiment, the secondary transform may conditionally adopt a non-separable secondary transform (hereinafter, referred to as 'NSST'). For example, the NSST may be applied only to the intra prediction block and may have a transform set applicable to each prediction mode group.

Here, the prediction mode group may be configured based on symmetry with respect to a prediction direction. For example, since prediction mode 52 and prediction mode 16 are symmetrical based on prediction mode 34 (diagonal direction), the same transform set may be applied by forming one group. In this case, when the transform for prediction mode 52 is applied, input data is transposed and then applied because prediction mode 52 has the same transform set as prediction mode 16.

Meanwhile, since the symmetry for the direction does not exist in the case of a planar mode and a DC mode, each mode has a different transform set and the corresponding transform set may be constituted by two transforms. In respect to the remaining direction modes, each transform set may be constituted by three transforms. However, the present disclosure is not limited thereto, and each transform set may be constituted by a plurality of transforms.

Figure 13:
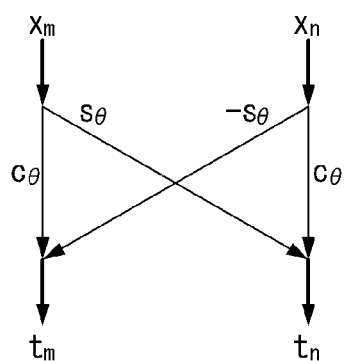
FIG. 13 is a calculation flow diagram for givens rotation as an embodiment to which the present disclosure is applied.

FIG. 13 is a calculation flow diagram for Givens rotation as an embodiment to which the present disclosure is applied.

As another embodiment, the NSST may not be applied to the entire primary transformed block but may be applied only to a top-left 8×8 region. For example, when the block size is 8×8 or more, 8×8 NSST is applied and when the block size is less than 8×8, 4×4 NSST is applied and in this case, the block is divided into 4×4 blocks and then, the 4×4 NSST is applied to each of the divided blocks.

As another embodiment, even in the case of 4×N/N×4 (N>=16), the 4×4 NSST may be applied.

Since both the 8×8 NSST and the 4×4 NSST follow a transformation combination configuration described in the present disclosure and are the non-separable transforms, the 8×8 NSST receives 64 data and outputs 64 data and the 4×4 NSST has 16 inputs and 16 outputs.

Both the 8×8 NSST and the 4×4 NSST are configured by a hierarchical combination of Givens rotations. A matrix corresponding to one Givens rotation is shown in Equation 4 below and a matrix product is shown in Equation 5 below.

$$R_\theta = \begin{bmatrix} \cos\theta & -\sin\theta \\ \sin\theta & \cos\theta \end{bmatrix}$$ [Equation 4]

$$t_m = x_m \cos\theta - x_n \sin\theta$$ [Equation 5]
$$t_n = x_m \sin\theta + x_n \cos\theta$$

As illustrated in FIG. 13 above, since one Givens rotation rotates two data, in order to process 64 data (for the 8×8 NSST) or 16 data (for the 4×4 NSST), a total of 32 or 8 Givens rotations are required.

Therefore, a bundle of 32 or 8 is used to form a Givens rotation layer. Output data for one Givens rotation layer is transferred as input data for a next Givens rotation layer through a determined permutation.

Figure 14:
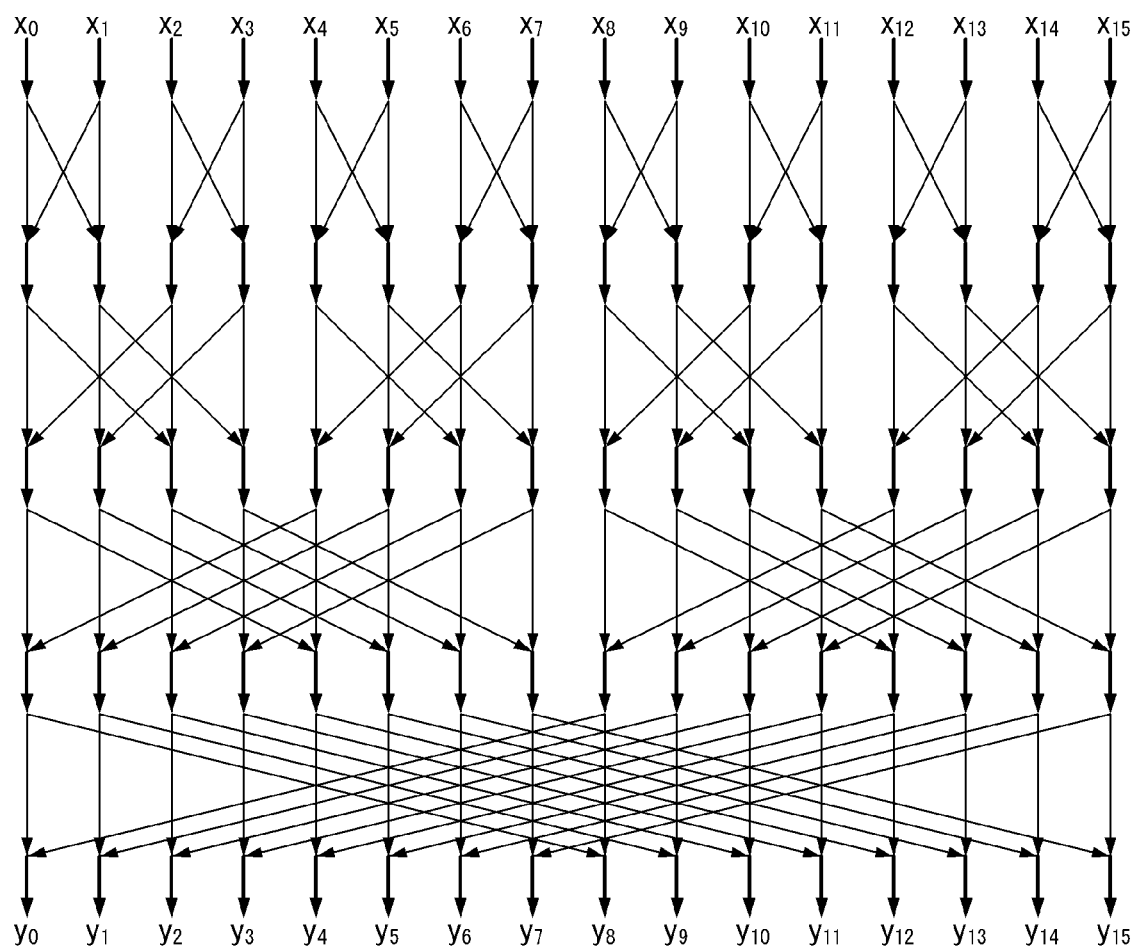
FIG. 14 illustrates one round configuration in 4×4 NSST constituted by a givens rotation layer and permutations as an embodiment to which the present disclosure is applied.

FIG. 14 illustrates one round configuration in 4×4 NSST constituted by a givens rotation layer and permutations as an embodiment to which the present disclosure is applied.

Referring to FIG. 14 above, it is illustrated that four Givens rotation layers are sequentially processed in the case of the 4×4 NSST. As illustrated in FIG. 14 above, the output data for one Givens rotation layer is transferred as the input data for the next Givens rotation layer through a determined permutation (i.e., shuffling).

As illustrated in FIG. 14 above, patterns to be permutated are regularly determined and in the case of the 4×4 NSST, four Givens rotation layers and the corresponding permutations are combined to form one round.

In the case of the 8×8 NSST, six Givens rotation layers and the corresponding permutations form one round. The 4×4 NSST goes through two rounds and the 8×8 NSST goes through four rounds. Different rounds use the same permutation pattern, but applied Givens rotation angles are different. Accordingly, angle data for all Givens rotations constituting each transform need to be stored.

As a last step, one permutation is further finally performed on the data output through the Givens rotation layers, and corresponding permutation information is stored separately for each transform. In forward NSST, the corresponding permutation is performed last and in inverse NSST, a corresponding inverse permutation is applied first on the contrary thereto.

In the case of the inverse NSST, the Givens rotation layers and the permutations applied to the forward NSST are performed in the reverse order and rotation is performed by taking a negative value even for an angle of each Givens rotation.

Figure 15A:
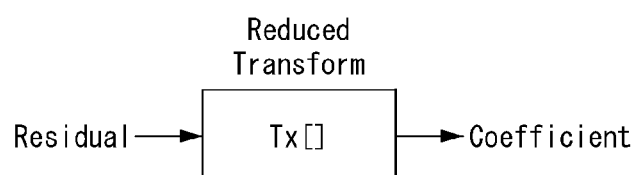
FIGS. 15A and 15B is a block diagram for describing operations of a forward reduced transform and an inverse reduced transform as an embodiment to which the present disclosure is applied.
Figure 15B:
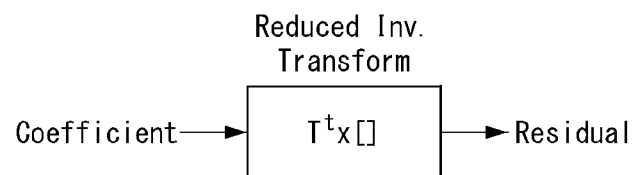

FIGS. 15A and 15B is a block diagram for describing operations of a forward reduced transform and an inverse reduced transform as an embodiment to which the present disclosure is applied.

Reduced Secondary Transform (RST)

When it is assumed that an orthogonal matrix representing one transform has an N×N form, a reduced transform (hereinafter, referred to as 'RT') leaves only R transform basis vectors among N transform basis vectors (R<N). A matrix for forward RT generating the transform coefficients is given by Equation 6 below.

$$T_{R \times N} = \begin{bmatrix} t_{11} & t_{12} & t_{13} & \cdots & t_{1N} \\ t_{21} & t_{22} & t_{23} & \cdots & t_{2N} \\ \vdots & & \ddots & & \vdots \\ t_{R1} & t_{R2} & t_{R3} & \cdots & t_{RN} \end{bmatrix}$$ [Equation 6]

Since a matrix for an inverse RT becomes a transpose matrix of the forward RT matrix, the application of the forward RT and the inverse RT is illustrated as illustrated in FIGS. 15A and 15B above.

When a case of applying the RT to the top-left 8×8 block of the transform block which goes through the primary transform is assumed, the RT may be referred to as an 8×8 reduced secondary transform (8×8 RST).

When the R value of Equation 6 above is 16, the forward 8×8 RST has a 16×64 matrix form and the inverse 8×8 RST has a 64×16 matrix form.

Further, the transform set configuration which is the same as that illustrated in FIG. 12 above may be applied even to the 8×8 RST. That is, a corresponding 8×8 RST may be applied according to the transform set in FIG. 12 above.

As an embodiment, when one transform set includes two or three transforms according to the intra prediction mode in FIG. 12 above, one of a maximum of 4 transforms including a case of not applying the secondary transform may be configured to be selected. Here, one transform may be regarded as an Identity matrix.

When indexes of 0, 1, 2, and 3 are assigned to the four transforms, respectively, a syntax element called an NSST index may be signaled for each transform block, thereby designating a corresponding transform. That is, in the case of the NSST, the 8×8 NSST may be designated for the 8×8 top-left block through the NSST index and the 8×8 RST may be designated in an RST configuration. Further, in this case, index 0 may be allocated to a case where the identity matrix, i.e., the secondary transform is not applied.

When the forward 8×8 RST shown in Equation 6 above is applied, 16 valid transform coefficients are generated, and as a result, it may be regarded that 64 input data constituting an 8×8 region are reduced to 16 output data. From the perspective of a two-dimensional region, only a one-quarter region is filled with the valid transform coefficient. Accordingly, a 4×4 top-left region in FIG. 16 may be filled with 16 output data obtained by applying the forward 8×8 RST.

Figure 16:
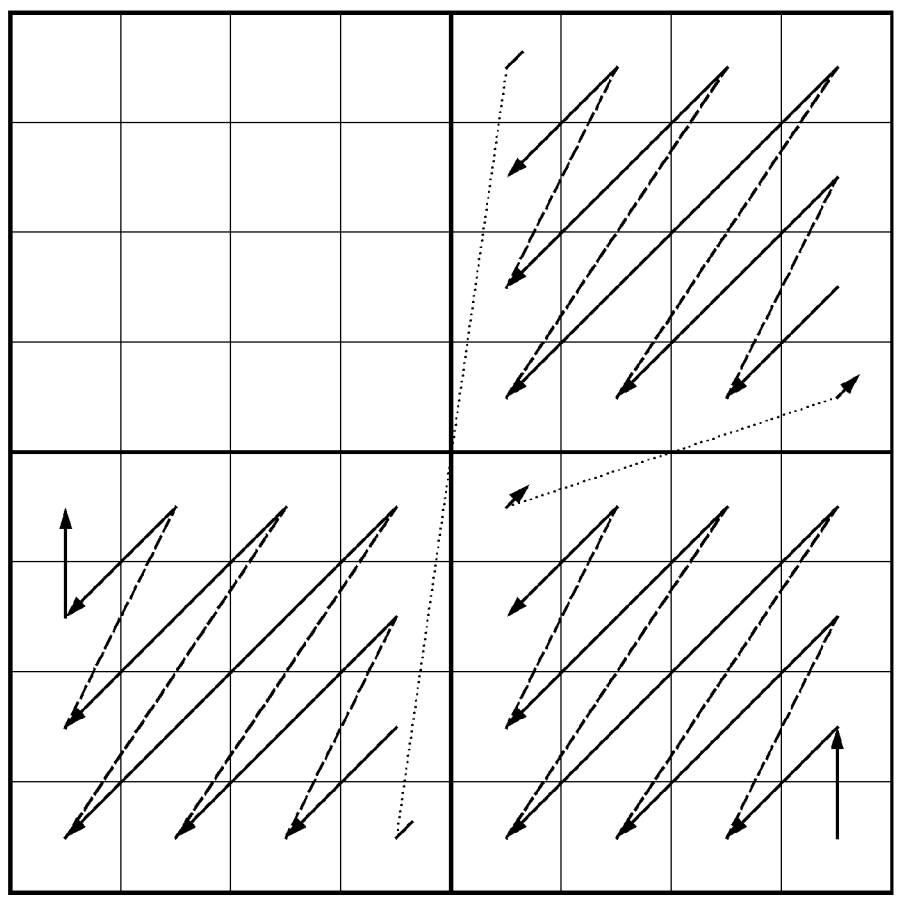
FIG. 16 is a diagram illustrating a process of performing an inverse scan from $64^{th}$ to $17^{th}$ according to an inverse scan order as an embodiment to which the present disclosure is applied.

FIG. 16 is a diagram illustrating a process of performing an inverse scan from $64^{th}$ to $17^{th}$ according to an inverse scan order as an embodiment to which the present disclosure is applied.

FIG. 16 above illustrates scanning from the $17^{th}$ coefficient to the $64^{th}$ coefficient when the forward scanning order starts from 1 (in the forward scan order). However, FIG. 16 above illustrates the inverse scan and this illustrates performing the inverse scanning from the $64^{th}$ coefficient to the $17^{th}$ coefficient.

Referring to FIG. 16 above, the top-left 4×4 region is a region of interest (ROI) to which the valid transform coefficient is allocated and the remaining region is empty. That is, a value of 0 may be allocated to the remaining region by default.

If there is a valid transform coefficient other than 0 in a region other than the ROI region of FIG. 16 above, this means that the 8×8 RST is not applied, and as a result, in this case, NSST index coding corresponding thereto may be omitted.

Conversely, if there is no non-zero transform coefficient in the region other than the ROI region of FIG. 16 above (if the 8×8 RST is applied, when 0 is allocated to the region other than the ROI), there is a possibility that the 8×8 RST will be applied, and as a result, the NSST index may be coded.

As such, conditional NSST index coding may be performed after the residual coding process because it is necessary to check the existence of the non-zero transform coefficient.

The present disclosure provides a method for designing an RST and associated optimization methods which may be applied to the 4×4 block from an RST structure. The embodiments disclosed in the present disclosure may be applied to the 8×8 RST or another type of transform in addition to the 4×4 RST.

FIGS. 17A through 17C illustrate three forward scan orders for a transform coefficient block (transform block) as an embodiment to which the present disclosure is applied.

Embodiment 1: RST Applicable to 4×4 Block

A non-separable transform that may be applied to one 4×4 block is a 16×16 transform. That is, when data elements constituting the 4×4 block are arranged in a row-first or column-first order, a 16×1 vector is used to apply the non-separable transform.

The forward 16×16 transform is constituted by 16 row-wise transformed basis vectors and when an inner product is applied to the 16×1 vector and each transform basis vector, the transform coefficient for the transform basis vector is obtained. A process of obtaining transform coefficients corresponding to all of 16 transform basis vectors is equivalent to multiplying the 16×16 non-separable transform matrix by the input 16×1 vector.

The transform coefficients obtained by the matrix product have a 16×1 vector form, and statistical characteristics may be different for each transform coefficient. For example, when a 16×1 transform coefficient vector is constituted by a $0^{th}$ element to a $15^{th}$ element, a variance of the $0^{th}$ element may be greater than the variance of the $15^{th}$ element. In other words, as the element is positioned former, a corresponding variance value of the element is larger, so that the element may have a larger energy value.

When the inverse 16×16 non-separable transform is applied from the 16×1 transform coefficient, an original 4×4 block signal may be reconstructed. When the forward 16×16 non-separable transform is an orthonormal transform, the corresponding inverse 16×16 transform may be obtained through the transpose matrix for the forward 16×16 transform.

When the 16×1 transform coefficient vector is multiplied by the inverse 16×16 non-separable transform matrix, data in the form of the 16×1 vector may be obtained and when the obtained data are arranged in the row-first or column-first order which is first applied, the 4×4 block signal may be reconstructed.

As described above, elements constituting the 16×1 transform coefficient vector may have different statistical characteristics.

If transform coefficients arranged at a former side (close to an $0^{th}$ element) have larger energy, a signal may be reconstructed, which is quite close to the original signal even though the inverse transform is applied to some transform coefficients which first appear without using all transform coefficients. For example, when the inverse 16×16 non-separable transform is constituted by 16 column basis vectors, only L column basis vectors are left to form a 16×L matrix. In addition, when a 16×L matrix and an L×1 vector are multiplied by each other after only L important transform coefficients are left among the transform coefficients (L×1 vector), when the 16×L matrix and the L×1 vector are multiplied by each other, the 16×1 vector may be reconstructed, which has a small error from original input 16×1 vector data.

As a result, since only L coefficients are used for data reconstruction, the L×1 transform coefficient vector is obtained instead of the 16×1 transform coefficient vector even when obtaining the transform coefficient. That is, when an L×16 transform is configured by selecting L corresponding row-wise transform vectors in the forward 16×16 non-separable transform matrix and the configured L×16 transform is then multiplied by the 16×1 input vector, L important transform coefficients may be obtained.

The L value has a range of $1 \leq L < 16$ and in general, L vectors may be selected by an arbitrary method among 16 transform basis vectors, but it may be advantageous in terms of coding efficiency to select transform basis vectors having a high importance in terms of energy of the signal from the viewpoint of coding and decoding.

Embodiment 2: Configuration of Application Region of 4×4 RST and Arrangement of Transform Coefficients The 4×4 RST may be applied as the secondary transform, and may be applied secondarily to a block to which a primary transform such as DCT-type 2 is applied. When the size of the block to which the primary transform is applied is N×N, the size of the block to which the primary transform is applied is generally larger than 4×4. Therefore, when applying the 4×4 RST to the N×N block, there may be two methods as follows.

Embodiment 2-1) The 4×4 RST is not applied to all N×N regions, but may be applied only to some regions. For example, the 4×4 RST may be applied only to the top-left M×M region (M≤N).

Embodiment 2-2) A region to which the secondary transform is to be applied may be divided into 4×4 blocks and then the 4×4 RST may be applied to each divided block.

As an embodiment, embodiments 2-1) and 2-2) may be mixed and applied. For example, only the top-left M×M region may be divided into 4×4 blocks and then the 4×4 RST may be applied.

As an embodiment, the secondary transform may be applied only to the top-left 8×8 region and when N×N block is equal to or larger than 8×8, the 8×8 RST may be applied and when the N×N block is smaller than 8×8 (4×4, 8×4, and 4×8), the N×N block may be divided into 4×4 blocks and then the 4×4 RST may be applied to each of 4×4 blocks as In embodiment 2-2) above. Further, even in the case of 4×N/N×4 (N>=16), the 4×4 NSST may be applied.

When L ($1 \leq L < 16$) transform coefficients are generated after applying the 4×4 RST, a degree of freedom for how the L transform coefficients are arranged is generated. However, since there will be a predetermined order when processing the transform coefficient in a residual coding step, coding performance may vary depending on how the L transform coefficients are arranged in a 2D block.

For example, In the case of residual coding of HEVC, coding starts from a position farthest from a DC position. This is to enhance the coding performance by using a fact that a quantized coefficient value is zero or is close to zero as moving away from the DC position.

Therefore, it may be advantageous in terms of the coding performance to arrange more important coefficients with high energy even for the L transform coefficients so that the L transform coefficients are coded later in the order of residual coding.

FIGS. 17A through 17C illustrate three forward scan orders in units of a 4×4 transform block (coefficient group (CG)) applied in HEVC. The residual coding follows the reverse order of the scan order of FIGS. 17A through 17C above (i.e., coding is performed in the order of 16 to 1).

Since three scan orders presented in FIGS. 17A through 17C above are selected according to the intra prediction mode, the present disclosure may be configured to determine the scan order according to the intra prediction mode similarly even for the L transform coefficients.

Figure 18:
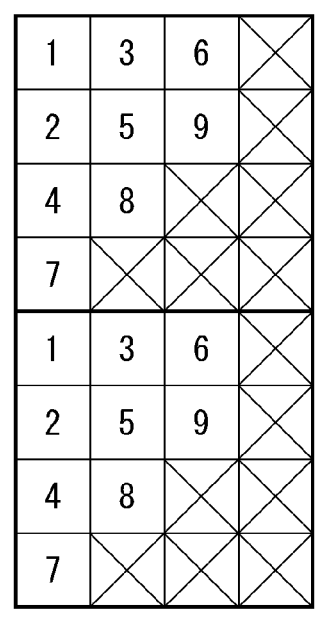

FIG. 18 illustrates positions of valid transform coefficients and a forward scan order for each of 4×4 blocks when diagonal scan is applied and 4×4 RST is applied in top-left 4×8 blocks as an embodiment to which the present disclosure is applied.

When following a diagonal scan order in FIGS. 17A through 17C above and dividing the top-left 4×8 block into 4×4 blocks and applying the 4×4 RST to each 4×4 block, if the L value is 8 (i.e., if only 8 transform coefficients among 16 transform coefficients are left), the transform coefficients may be positioned as in FIG. 18 above.

Only half of respective 4×4 blocks may have the transform coefficients and a value of 0 may be applied to locations marked with X by default.

Accordingly, the residual coding may be applied by arranging L transform coefficients for each 4×4 block according to the scan order illustrated in FIGS. 17A through 17C above and assuming that 16–L remaining positions of each 4×4 block are filled with zero.

Figures 19A, 19B:
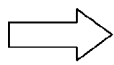
FIGS. 19A and 19B illustrates a case where valid transform coefficients of two 4×4 blocks are combined into one 4×4 block when a diagonal scan is applied and 4×4 RST is applied in upper left 4×8 blocks as an embodiment to which the present disclosure is applied.

FIGS. 19A and 19B illustrates a case where valid transform coefficients of two 4×4 blocks are combined into one 4×4 block when diagonal scan is applied and 4×4 RST is applied in top-left 4×8 blocks as an embodiment to which the present disclosure is applied.

Referring to FIGS. 19A and 19B above, L transform coefficients arranged in two 4×4 blocks may be combined into one. In particular, when the L value is 8, since the transform coefficients of two 4×4 blocks are combined while completely filling one 4×4 block, no transform coefficient is also left in the other one 4×4 block.

Accordingly, since most residual coding is not required with respect to the empty 4×4 block, corresponding coded_sub_block_flag may be coded with 0.

Further, as an embodiment of the present disclosure, various schemes may be applied even to how transform coefficients of two 4×4 blocks are mixed. The transform coefficients may be combined according to a random order, but the present disclosure may provide the following methods.

1) Transform coefficients of two 4×4 blocks are alternately mixed in the scan order. That is, in FIG. 18 above, when the transform coefficients for the top block are $c_0^u, c_1^u, c_2^u, c_3^u, c_4^u, c_5^u, c_6^u$, and $c_7^u$ and the transform coefficients for the bottom block are $c_0^l, c_1^l, c_2^l, c_3^l, c_4^l, c_5^l, c_6^l$, and $c_7^l$, the transform coefficients may be mixed alternately one by one like $c_0^u, c_0^l, c_1^u, c_1^l, c_2^u, c_2^l, \ldots, c_7^u, c_7^l$. Alternatively, the orders of $c_\#^u$ and $c_\#^l$ may be changed. That is, $c_\#^l$ may be configured to come out first.

2) The transform coefficients for a first 4×4 block may be first arranged and then the transform coefficients for a second 4×4 block may be arranged. That is, the transform coefficients may be connected and arranged like $c_0^u, c_1^u, \ldots, c_7^u, c_0^l, c_1^l, \ldots, c_7^l$. Alternatively, the order may be changed like $c_0^l, c_1^l, \ldots, c_7^l, c_0^u, c_1^u, \ldots, c_7^u$.

Embodiment 3: Method for Coding NSST Index for 4×4 RST

When the 4×4 RST is applied as illustrated in FIG. 18 above, L+1-th to 16-th may be filled with the 0 value according to the transform coefficient scan order for each of the 4×4 blocks.

Accordingly, when a non-zero value is generated at L+1-th to 16-th positions even in one of two 4×4 blocks, it may be known that this case is a case where the 4×4 RST is not applied.

When the 4×4 RST also has a structure in which one of the transform sets prepared as the NSST is selected and applied, a transform index (which may be referred to as an NSST index in the embodiment) for which transform to apply may be signaled.

It is assumed that any decoder may know the NSST index through bitstream parsing and the parsing is performed after residual decoding.

When the residual decoding is performed and it is confirmed that at least one non-zero transform coefficient exists between L+1-th and 16-th, the 4×4 RST is not applied, and thus the NSST index may be configured to not be parsed.

Accordingly, the NSST index is selectively parsed only when necessary to reduce signaling cost.

If the 4×4 RST is applied to a plurality of 4×4 blocks in a specific region as illustrated in FIG. 18 above (for example, the same 4×4 RST may be applied to all of the plurality of 4×4 blocks or different 4×4 RSTs may be applied), the 4×4 RST applied to the all 4×4 blocks may be designated through one NSST index. In this case, the same 4×4 RST may be designated or the 4×4 RST applied to each of all 4×4 blocks may be designated.

Since whether the 4×4 RST is applied to the all 4×4 blocks by one NSST index, it may be checked whether non-zero transform coefficients exist at L+1-th to 16-th locations for the all 4×4 blocks during a residual decoding process. As a checking result, when the non-zero transform coefficient exists at a location (L+1-th to 16-th locations) which is not accepted even in one 4×4 block, the NSST index may be configured to not be coded.

The NSST index may be signaled separately for the luma block and the chroma block, and in the case of the chroma block, separate NSST indexes may be signaled for Cb and Cr, and one NSST index may be shared.

When one NSST index is shared for Cb and Cr, 4×4 RST designated by the same NSST index may be applied. In this case, the 4×4 RSTs for Cb and Cr themselves may be the same or the NSST index may be the same, but separate 4×4 RSTs may be provided.

To apply the conditional signaling to the shared NSST index, it is checked whether non-zero transform coefficients exist at L+1-th to 16-th for all 4×4 blocks for Cb and Cr and when the non-zero transform coefficient exists, the NSST index may be configured to not be signaled.

As illustrated in FIGS. 19A and 19B above, even for a case where the transform coefficients for two 4×4 blocks are combined, it is checked whether the non-zero transform coefficient exists at a location where the valid transform coefficient does not exist when the 4×4 RST is applied and then it may be determined whether the NSST is signaled.

For example, as illustrated in FIG. 19B above, when the L value is 8 and the valid transform coefficients do not exist for one 4×4 blocks at the time of applying the 4×4 RST (a block marked with X), coded_sub_block_flag of a block where the valid transform coefficients do not exist may be checked. In this case, when coded_sub_block_flag is 1, the NSST index may be configured to not be signaled.

Embodiment 4: Optimization Method for Case where Coding for NSST Index is Performed Before Residual Coding When coding for the NSST index is performed before residual coding, whether to apply the 4×4 RST is predetermined, and as a result, residual coding may be omitted for locations where 0 is allocated to the transform coefficient.

Here, whether to apply the 4×4 RST may be configured to be known through the NSST index. For example, when the NSST index is 0, the 4×4 RST is not applied.

Alternatively, the NSST index may be signaled through a separate syntax element (e.g., NSST flag). For example, if a separate syntax element is called the NSST flag, the NSST flag is parsed first to determine whether the 4×4 RST is applied, and if the NSST flag value is 1, the residual coding may be omitted for locations where no valid transform coefficient may exist.

As an embodiment, when the residual coding is performed, a last non-zero transform coefficient location on the TU is coded first. When the coding for the NSST index is performed after coding the last non-zero transform coefficient location and it is assumed that the 4×4 RST is applied to the location of the last non-zero transform coefficient, if the last non-zero transform coefficient location is determined as a location where the non-zero transform coefficient may not be generated, the 4×4 RST may be configured not to be applied to the last non-zero transform coefficient location without coding the NSST index.

For example, since in the case of locations marked with X in FIG. 18 above, valid transformation coefficients are not positioned when the 4×4 RST is applied (e.g., the locations may be filled with zero values), when the last non-zero transform coefficient is positioned in the region marked with X, the coding for the NSST index may be omitted. When the last non-zero transform coefficient is not positioned in the region marked with X, the coding of the NSST index may be performed.

As an embodiment, when it is checked whether to apply the 4×4 RST by conditionally coding the NSST index after the coding for the last non-zero transform coefficient location, the remaining residual coding portion may be processed by two following schemes.

1) In case of not applying the 4×4 RST, general residual coding is kept as it is. That is, the coding is performed under the assumption that the non-zero transform coefficient may exist at any location from the non-zero transform coefficient location to DC.

2) When the 4×4 RST is applied, since no transform coefficient exists for a specific location or a specific 4×4 block (e.g., an X location of FIG. 18 above, which may be filled with 0 by default), the residual for the corresponding location or block may not be performed.

For example, in a case of reaching the location marked with X in FIG. 18 above, coding for sig_coeff_flag may be omitted. Here, sig_coeff_flag means a flag indicating whether the non-zero transform coefficient exists at a corresponding location.

When transform coefficients of two blocks are combined as illustrated in FIGS. 19A and 19B above, the coding for coded_sub_block_flag may be omitted for the 4×4 blocks allocated with 0 and a corresponding value may be derived to 0 and all corresponding 4×4 blocks may be derived to zero values without separate coding.

In a case where the NSST index is coded after coding the non-zero transform coefficient location, when an x position $P_x$ and a y position $P_y$ of the last non-zero transform coefficient are smaller than $T_x$ and $T_y$, respectively, the NSST Index coding may be omitted and the 4×4 RST may not be applied.

For example, a case of $T_x=1$ and $T_y=1$ means that the NSST index coding is omitted for a case where the non-zero transform coefficient exists at the DC position.

A scheme of determining whether to code the NSST index through comparison with the threshold may be differently applied to luma and chroma. For example, different $T_x$ and $T_y$ may be applied to the luma and the chroma and the threshold may be applied to the luma and not applied to the chroma. Or vice versa.

Two methods described above, that is, a first method for omitting the NSST index coding when the non-zero transform coefficient is located in a region where the valid transform coefficient does not exist and a second method for omitting the NSST index coding when each of an X coordinate and a Y coordinate for the non-zero transform coefficient is smaller than a predetermined threshold may be simultaneously applied.

For example, a threshold for a position coordinate of the last non-zero transform coefficient may be first checked and then it may be checked whether the last non-zero transform coefficient is located in the region where the valid transform coefficient does not exist. Alternatively, the order may be changed.

Methods presented in Embodiment 4 may be applied even to the 8×8 RST. That is, when the last non-zero transform coefficient is located in a region other than the top-left 4×4 in the top-left 8×8 region, the coding for the NSST index may be omitted and if not, the NSST index coding may be performed.

Further, when both X and Y coordinate values for the non-zero transform coefficient are less than a threshold, the coding for the NSST index may be omitted. Alternatively, two methods may be applied together.

Embodiment 5: Applying Different NSST Index Coding and Residual Coding Schemes to Luma and Chroma when Applying RST The schemes described in Embodiments 3 and 4 above may be differently applied to luma and chroma, respectively. That is, the NSST index coding and residual coding schemes for the luma and the chroma may be differently applied.

For example, the luma may adopt the scheme of Embodiment 4 above and the chroma may adopt the scheme of Embodiment 3 above. Alternatively, the luma may adopt the conditional NSST index coding presented in Embodiment 3 or 4 above and the chroma may not adopt the conditional NSST index coding. Or vice versa.

Figure 20:
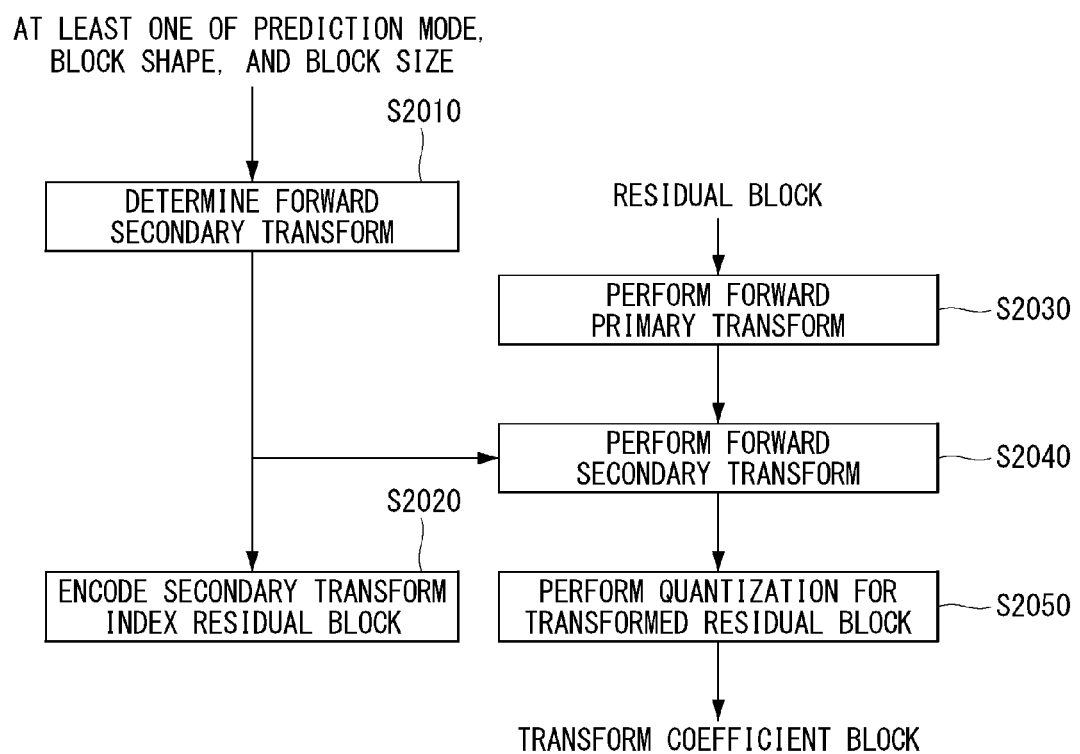
FIG. 20 is a flowchart of encoding a video signal based on a reduced secondary transform as an embodiment to which the present disclosure is applied.

FIG. 20 is a flowchart of encoding a video signal based on reduced secondary transform as an embodiment to which the present disclosure is applied.

The encoder may determine (or select) the forward secondary transform based on at least one of the prediction mode, the block shape, and/or the block size of the current block (S2010). In this case, a candidate of the forward secondary transform may include at least one of the embodiments of FIG. 6 and/or FIG. 12 above.

The encoder may determine an optimal forward secondary transform through Rate Distortion optimization. The optimal forward secondary transform may correspond to one of a plurality of transform combinations and the plurality of transform combinations may be defined by a transform index. For example, for the RD optimization, results of performing al of the forward secondary transform, quantization, residual coding, etc., may be compared for respective candidates. In this case, an equation such as cost=rate+ λ·distortion or cost=distortion+λ·rate may be used, but the present disclosure is not limited thereto.

The encoder may signal a secondary transform index corresponding to the optimal forward secondary transform (S2020). Here, the secondary transform index may adopt other embodiments described in the present disclosure.

For example, the secondary transform index may adopt the transform set configuration of FIG. 12 above. Since one transform set includes two or three transforms according to the intra prediction mode, one of a maximum of four transforms may be configured to be selected in addition to a case of not applying the secondary transform. When indexes of 0, 1, 2, and 3 are assigned to the four transforms, respectively, an applied transform may be designated by signaling the secondary transform index for each transform coefficient block. In this case, index 0 may be allocated to a case where the identity matrix, i.e., the secondary transform is not applied.

As another embodiment, the signaling of the secondary transform index may be performed in any one step of 1) before residual coding, 2) in the middle of residual coding (after coding the non-zero transform coefficient position), or 3) after residual coding. The embodiments will be described below in detail.

1) Method for signaling secondary transform index before residual coding

The encoder may determine the forward secondary transform.

The encoder may signal the secondary transform index corresponding to the forward secondary transform.

The encoder may code the position of the last non-zero transform coefficient.

The encoder may perform residual coding for syntax elements other than the position of the last non-zero transform coefficient.

2) Method for signaling secondary transform index in middle of residual coding

The encoder may determine the forward secondary transform.

The encoder may code the position of the last non-zero transform coefficient.

When the non-zero transform coefficient is not located in a specific region, the encoder may code the secondary transform index corresponding to the forward secondary transform. Here, in the case where the reduced secondary transform is applied, the specific region represents a remaining region other than the position where the non-zero transform coefficient may exist when the transform coefficients are arranged according to the scan order. However, the present disclosure is not limited thereto.

The encoder may perform residual coding for syntax elements other than the position of the last non-zero transform coefficient.

3) Method for signaling secondary transform index before residual coding

The encoder may determine the forward secondary transform.

The encoder may code the position of the last non-zero transform coefficient.

When the non-zero transform coefficient is not located in a specific region, the encoder may perform residual coding for syntax elements other than the position of the last non-zero transform coefficient. Here, in the case where the reduced secondary transform is applied, the specific region represents a remaining region other than the position where the non-zero transform coefficient may exist when the transform coefficients are arranged according to the scan order. However, the present disclosure is not limited thereto.

The encoder may signal the secondary transform index corresponding to the forward secondary transform.

Meanwhile, the encoder may perform the forward first order transform for the current block (residual block) (S2030). Here, step S2010 and/or step S2020 may be similarly applied to the forward primary transform.

The encoder may perform the forward secondary transform for the current block by using the optimal forward secondary transform (S2040). For example, the optimal forward secondary transform may be the reduced secondary transform. The reduced secondary transform refers to a transform in which N residual data (N×1 residual vectors) are input and L (L<N) transform coefficient data (L×1 transform coefficient vectors) are output.

As an embodiment, the reduced secondary transform may be applied to a specific region of the current block. For example, when the current block is N×N, the specific region may mean a top-left N/2×N/2 region. However, the present disclosure is not limited thereto and may be differently configured according to at least one of the prediction mode, the block shape, or the block size. For example, when the current block is N×N, the specific region may mean a top-left M×M region (M≤N).

Meanwhile, the encoder performs quantization for the current block to generate a transform coefficient block (S2050).

The encoder performs entropy encoding for the transform coefficient block to generate the bitstream.

Figure 21:
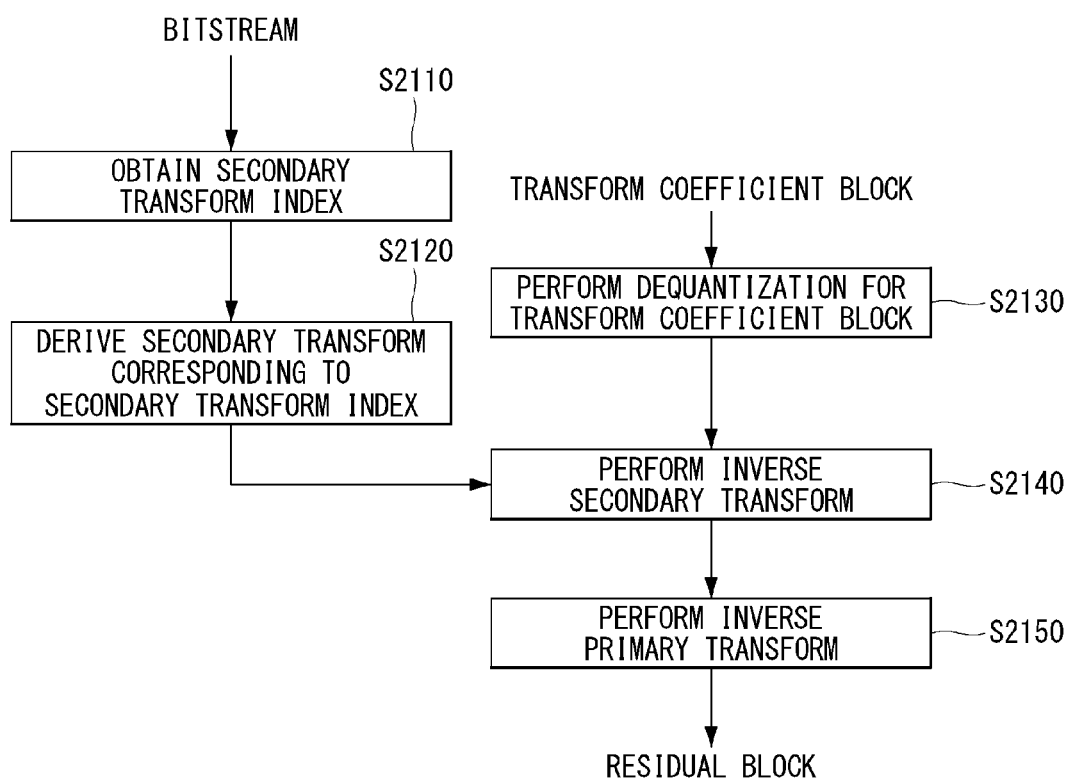
FIG. 21 is a flowchart of decoding a video signal based on reduced secondary transform as an embodiment to which the present disclosure is applied.

FIG. 21 is a flowchart of decoding a video signal based on reduced secondary transform as an embodiment to which the present disclosure is applied.

The decoder may obtain the secondary transform index from the bitstream (S2110). Here, the secondary transform index may adopt other embodiments described in the present disclosure. For example, the secondary transform index may include at least one of the embodiments of FIG. 6 and/or FIG. 12 above.

As another embodiment, the obtaining of the secondary transform index may be performed in any one step of 1) before residual coding, 2) in the middle of residual coding (after decoding the non-zero transform coefficient position), or 3) after residual coding.

The decoder may derive the secondary transform corresponding to the secondary transform index (S2120). In this case, the candidate of the secondary transform may include at least one of the embodiments of FIG. 6 and/or FIG. 12 above.

However, steps S2110 and S2120 are embodiments and the present disclosure is not limited thereto. For example, the decoder may not obtain the secondary transform index, but derive the secondary transform based on at least one of the prediction mode, the block shape, and/or the block size of the current block.

Meanwhile, the decoder may obtain the transform coefficient block by entropy-decoding the bitstream and perform dequantization for the transform coefficient block (S2130).

The decoder may perform the inverse secondary transform for the dequantized transform coefficient block (S2140). For example, the inverse secondary transform may be the reduced secondary transform. The reduced secondary transform means a transform in which N residual data (N×1 residual vectors) are input and L (L<N) transform coefficient data (L×1 transform coefficient vectors) are output.

As an embodiment, the reduced secondary transform may be applied to a specific region of the current block. For example, when the current block is N×N, the specific region may mean a top-left N/2×N/2 region. However, the present disclosure is not limited thereto and may be differently configured according to at least one of the prediction mode, the block shape, or the block size. For example, when the current block is N×N, the specific region may mean a top-left M×M region (M≤N) or M×L (M≤N, L≤N).

In addition, the decoder may perform the inverse primary transform for the inverse secondary transform result (S2150).

The decoder generates the residual block through step S2150 and the residual block and the prediction block are added to generate a reconstruction block.

Figure 22:
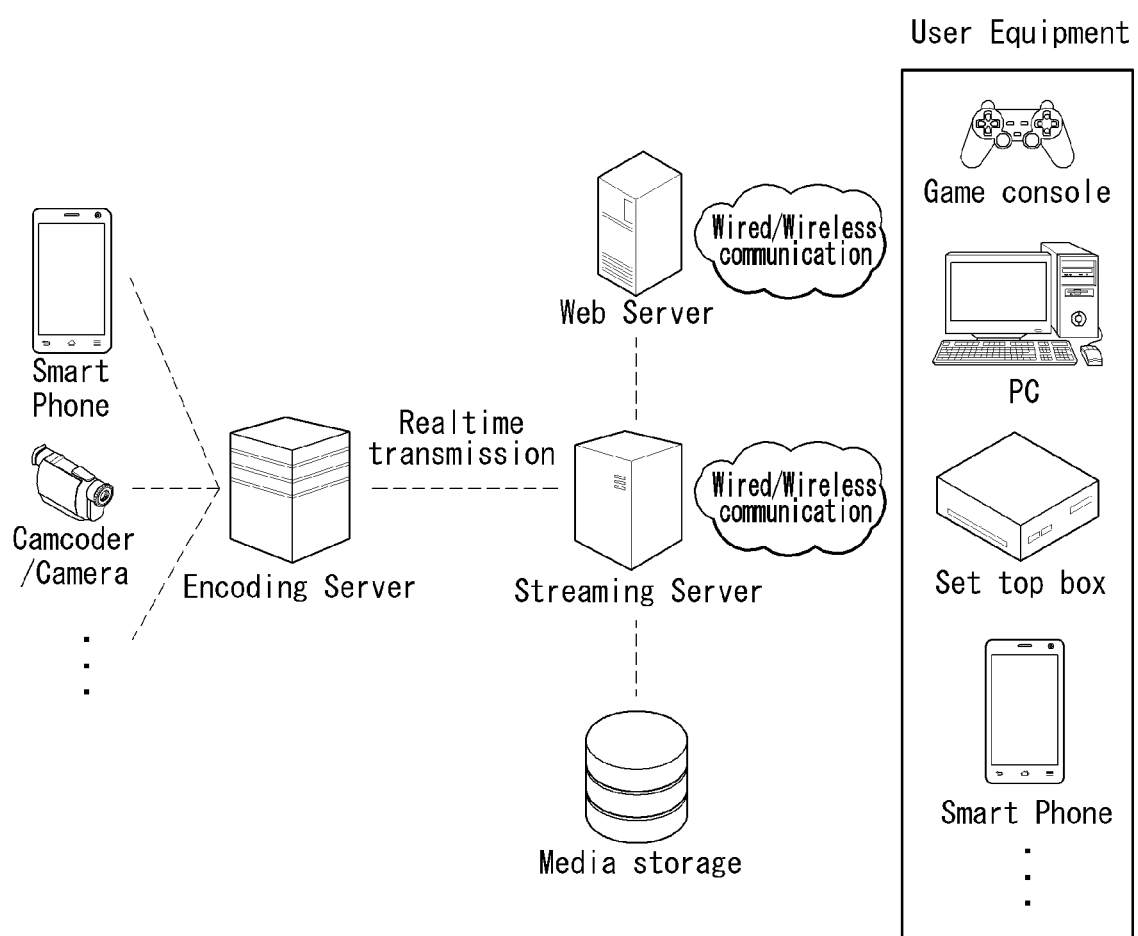
FIG. 22 is an architectural diagram of a content streaming system as an embodiment to which the present disclosure is applied.

FIG. 22 illustrates a content streaming system to which the disclosure is applied.

Referring to FIG. 22, the content streaming system to which the disclosure is applied may basically Include an encoding server, a streaming server, a web server, a media storage, a user equipment and a multimedia input device.

The encoding server basically functions to generate a bitstream by compressing content input from multimedia input devices, such as a smartphone, a camera or a camcorder, into digital data, and to transmit the bitstream to the streaming server. For another example, if multimedia input devices, such as a smartphone, a camera or a camcorder, directly generate a bitstream, the encoding server may be omitted.

The bitstream may be generated by an encoding method or bitstream generation method to which the disclosure is applied. The streaming server may temporally store a bitstream in a process of transmitting or receiving the bitstream.

The streaming server transmits multimedia data to the user equipment based on a user request through the web server. The web server plays a role as a medium to notify a user that which service is provided. When a user requests a desired service from the web server, the web server transmits the request to the streaming server. The streaming server transmits multimedia data to the user. In this case, the content streaming system may include a separate control server. In this case, the control server functions to control an instruction/response between the apparatuses within the content streaming system.

The streaming server may receive content from the media storage and/or the encoding server. For example, if content is received from the encoding server, the streaming server may receive the content in real time. In this case, in order to provide smooth streaming service, the streaming server may store a bitstream for a given time.

Examples of the user equipment may include a mobile phone, a smart phone, a laptop computer, a terminal for digital broadcasting, personal digital assistants (PDA), a portable multimedia player (PMP), a navigator, a slate PC, a tablet PC, an ultrabook, a wearable device (e.g., a watch type terminal (smartwatch), a glass type terminal (smart glass), and a head mounted display (HMD)), digital TV, a desktop computer, and a digital signage.

The servers within the content streaming system may operate as distributed servers. In this case, data received from the servers may be distributed and processed.

As described above, the embodiments described in the disclosure may be Implemented and performed on a processor, a microprocessor, a controller or a chip. For example, the function units illustrated in the drawings may be implemented and performed on a computer, a processor, a microprocessor, a controller or a chip.

Furthermore, the decoder and the encoder to which the disclosure is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, an over the top (OTT) video device, an Internet streaming service provision device, a three-dimensional (3D) video device, a video telephony device, and a medical video device, and may be used to process a video signal or a data signal. For example, the OTT video device may include a game console, a Blu-ray player, Internet access TV, a home theater system, a smartphone, a tablet PC, and a digital video recorder (DVR).

Furthermore, the processing method to which the disclosure is applied may be produced in the form of a program executed by a computer, and may be stored in a computer-readable recording medium. Multimedia data having a data structure according to the disclosure may also be stored in a computer-readable recording medium. The computer-readable recording medium includes all types of storage devices in which computer-readable data is stored. The computer-readable recording medium may include a Blu-ray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of the disclosure may be implemented as a computer program product using program code. The program code may be performed by a computer according to an embodiment of the disclosure. The program code may be stored on a carrier readable by a computer.

The aforementioned preferred embodiments of the disclosure have been disclosed for illustrative purposes, and those skilled in the art may improve, change, substitute, or add various other embodiments without departing from the technical spirit and scope of the disclosure disclosed in the attached claims.

The invention claimed is:

1. A decoder for a video decoding, the decoder comprising:
   a memory; and
   at least one processor connected to the memory, the at least one processor configured to:
   obtain, based on zero transform coefficients being at specific transform coefficient locations, a secondary transform index from a bitstream;
   derive an inverse secondary transform matrix corresponding to the secondary transform index, wherein the inverse secondary transform matrix is used for an inverse secondary transform outputting N coefficients (N×1 vector) based on inputted L (L<N) coefficients (L×1 vector);
   derive quantized transform coefficients for a current block from the bitstream;
   obtain non-zero transform coefficients by performing a dequantization for the quantized transform coefficients;

perform the inverse secondary transform for the non-zero transform coefficients based on the inverse secondary transform matrix;

perform an inverse primary transform for a block to which the inverse secondary transform is applied; and reconstruct the current block based on a block to which the inverse primary transform is applied, wherein the specific transform coefficient locations are arranged in a diagonal scan order from a (L+1)th location to a 16th location in the transform coefficients of the block to which the inverse secondary transform is applied, the block being a 4×4 block, N being 16, and L being 8.

2. An encoder for a video encoding, the encoder comprising:

a memory; and at least one processor connected to the memory, the at least one processor configured to:

perform a primary transform on a transform block;

derive a secondary transform matrix to be applied to the transform block, wherein the secondary transform matrix is used for a secondary transform outputting L (L<N) coefficients (L×1 vector) based on inputted N coefficients (N×1 vector);

perform the secondary transform on the transform block based on the secondary transform matrix;

obtain transform coefficients based on the secondary transform;

derive quantized transform coefficients by performing a quantization on the transform coefficients and encode information related to the quantized transform coefficients; and generate a secondary transform index corresponding to the secondary transform matrix, wherein zero transform coefficients are at specific transform coefficient locations, and wherein the specific transform coefficient locations are arranged in a diagonal scan order from a (L+1)th location to a 16th location in the transform coefficients of the block to which the secondary transform is applied, the block being a 4×4 block, N being 16, and L being 8.

3. A non-transitory computer-readable storage medium storing a bitstream generated by the encoder of claim 2.

4. An apparatus for transmitting data for a video, the apparatus comprising:

at least one processor configured to obtain a bitstream for the video, wherein the bitstream is generated based on performing a primary transform on a transform block, deriving a secondary transform matrix to be applied to the transform block, wherein the secondary transform matrix is used for a secondary transform outputting L (L<N) coefficients (L×1 vector) based on inputted N coefficients (N×1 vector), performing the secondary transform on the transform block based on the secondary transform matrix, obtaining transform coefficients based on the secondary transform, deriving quantized transform coefficients by performing a quantization on the transform coefficients and encoding information related to the quantized transform coefficients, and generating a secondary transform index corresponding to the secondary transform matrix; and a transmitter configured to transmit the data comprising the bitstream, wherein zero transform coefficients are at specific transform coefficient locations, and wherein the specific transform coefficient locations are arranged in a diagonal scan order from a (L+1)th location to a 16th location in the transform coefficients of the block to which the secondary transform is applied, the block being a 4×4 block, N being 16, and L being 8.

* * * * *